(12) United States Patent
Hansen et al.

(10) Patent No.: US 11,273,505 B2
(45) Date of Patent: Mar. 15, 2022

(54) CIRCULAR SAW DUST COLLECTION SHROUD

(71) Applicants: Kendall Hansen, Price, UT (US); Kyle Bjork, Buffalo, MN (US)

(72) Inventors: Kendall Hansen, Price, UT (US); Kyle Bjork, Buffalo, MN (US)

(73) Assignee: DUSTLESS DEPOT, LLC, Price, UT (US)

( * ) Notice: Subject to any disclaimer, the term of this patent is extended or adjusted under 35 U.S.C. 154(b) by 0 days.

(21) Appl. No.: 16/829,860

(22) Filed: Mar. 25, 2020

(65) Prior Publication Data

US 2020/0306849 A1  Oct. 1, 2020

Related U.S. Application Data

(60) Provisional application No. 62/824,406, filed on Mar. 27, 2019.

(51) Int. Cl.
*B23D 59/00* (2006.01)
*B23D 45/16* (2006.01)

(52) U.S. Cl.
CPC .......... *B23D 59/006* (2013.01); *B23D 45/16* (2013.01)

(58) Field of Classification Search
CPC ...... B23D 59/006; B24B 55/06; B24B 55/102
See application file for complete search history.

(56) References Cited

U.S. PATENT DOCUMENTS

| 437,004 | A | | 9/1890 | Shipley |
| 907,734 | A | | 12/1908 | Butterfield |
| 1,123,562 | A | | 1/1915 | Lund |
| 1,197,967 | A | | 9/1916 | Swenson |
| 1,302,263 | A | | 4/1919 | Woodworth |
| RE15,262 | E | | 1/1922 | Gurgel |
| 1,432,660 | A | | 10/1922 | Borque |
| 1,643,882 | A | | 9/1927 | Faiver |
| 1,779,031 | A | | 10/1930 | Casey |
| 1,830,151 | A | * | 11/1931 | Wilderson ......... B23Q 11/0046 83/162 |
| 1,833,785 | A | * | 11/1931 | Krieger ................ B23D 59/002 83/98 |
| 1,850,504 | A | | 3/1932 | Janes |

(Continued)

FOREIGN PATENT DOCUMENTS

DE 3811197 10/1989
EP 556713 8/1993

(Continued)

OTHER PUBLICATIONS

Bosch TG502 Tuck pointing grinder guard, accessed 2018, from Amazon.ca.

*Primary Examiner* — Ghassem Alie
*Assistant Examiner* — Samuel A Davies
(74) *Attorney, Agent, or Firm* — Pate Peterson PLLC; Brett Peterson

(57) ABSTRACT

A circular saw dust collection shroud is provided. The dust collection shroud includes a shroud body and a saw blade hood which is disposed around a circular saw blade. The saw blade hood may engage the upper blade guard of the circular saw. The dust collection shroud is reconfigurable to mount to either a left or a right handed circular saw and is adjustable relative to the saw to position the saw blade hood in a desired location around the saw blade.

20 Claims, 31 Drawing Sheets

(56) References Cited

U.S. PATENT DOCUMENTS

| | | |
|---|---|---|
| 2,032,382 A | 3/1936 | Torrison |
| 2,041,689 A | 5/1936 | Baumeister |
| 2,212,361 A | 8/1940 | Arthur |
| 2,279,186 A | 4/1942 | Terry et al. |
| 2,291,269 A | 7/1942 | Wiggleworth |
| 2,294,272 A | 8/1942 | Boice |
| 2,312,443 A | 3/1943 | Reiter |
| 2,339,324 A | 1/1944 | Fischer |
| 2,384,688 A | 9/1945 | Morris |
| 2,440,684 A | 5/1948 | Huelster |
| 2,440,685 A | 5/1948 | Huelster |
| 2,503,854 A | 4/1950 | Trainor |
| 2,520,725 A | 8/1950 | Judd |
| 2,676,624 A | 4/1954 | Gecman |
| 2,803,098 A | 8/1957 | Robert et al. |
| 2,817,134 A | 12/1957 | Fenton |
| 2,819,570 A | 1/1958 | Guilbert et al. |
| 2,819,571 A | 1/1958 | Morgan |
| 2,994,995 A | 8/1961 | Griffith |
| 3,091,851 A * | 6/1963 | Cummins ............ B23D 59/006 30/371 |
| 3,166,877 A | 1/1965 | Reames |
| 3,256,648 A | 6/1966 | Subonovich |
| 3,339,435 A | 9/1967 | Heitz |
| 3,468,076 A | 9/1969 | Jones |
| 3,511,322 A | 5/1970 | Holman |
| 3,667,170 A | 6/1972 | MacKay |
| 3,673,744 A | 7/1972 | Oimoen |
| 3,826,045 A | 7/1974 | Champayne |
| 3,835,543 A | 9/1974 | Polydoris et al. |
| 3,848,686 A | 11/1974 | Jysky et al. |
| 3,862,521 A | 1/1975 | Isaksson |
| 3,882,598 A | 5/1975 | Earle et al. |
| 3,882,644 A | 5/1975 | Cusumano |
| 3,945,281 A | 3/1976 | Kreitz |
| 3,987,589 A | 10/1976 | Marton |
| 4,011,792 A | 3/1977 | Davis |
| 4,016,649 A | 4/1977 | Kloster |
| 4,033,035 A | 7/1977 | Trimmer |
| 4,063,478 A | 12/1977 | Stuy |
| 4,090,297 A | 5/1978 | Wanner |
| 4,135,334 A | 1/1979 | Rudiger |
| 4,160,319 A | 7/1979 | Caruso |
| 4,201,256 A | 5/1980 | Truhan |
| 4,241,505 A | 12/1980 | Bodycomb, Jr. et al. |
| 4,253,362 A | 3/1981 | Olson |
| 4,296,572 A | 10/1981 | Quintana |
| 4,300,426 A | 11/1981 | Weaver |
| 4,326,864 A | 4/1982 | Sittler |
| 4,367,665 A | 1/1983 | Terpstra et al. |
| 4,381,628 A | 5/1983 | Dicke |
| 4,400,995 A | 8/1983 | Palm |
| 4,456,303 A | 6/1984 | Due |
| 4,515,504 A | 5/1985 | Moore |
| 4,566,511 A | 1/1986 | Robinson |
| 4,574,532 A | 3/1986 | Haberle et al. |
| 4,576,072 A | 3/1986 | Terpstra et al. |
| 4,622,782 A | 11/1986 | Roestenberg |
| 4,641,401 A | 2/1987 | Hasegawa |
| 4,646,480 A | 3/1987 | Williams |
| 4,697,389 A | 10/1987 | Romine |
| 4,761,877 A | 8/1988 | Rupp |
| 4,765,099 A | 8/1988 | Tanner |
| 4,782,632 A | 11/1988 | Matechuk |
| 4,868,949 A | 9/1989 | Loveless et al. |
| 4,891,915 A | 1/1990 | Yasuda |
| 4,905,420 A | 3/1990 | Flachenecker et al. |
| 4,921,308 A | 5/1990 | Yelton et al. |
| 4,921,375 A | 5/1990 | Famulari |
| 4,930,264 A | 6/1990 | Huang |
| 4,932,163 A | 6/1990 | Chilton et al. |
| 4,932,164 A | 6/1990 | Sullivan et al. |
| 5,033,552 A | 7/1991 | Hu |
| 5,034,041 A | 7/1991 | Austin |
| 5,061,123 A | 10/1991 | Broussard |
| 5,069,695 A | 12/1991 | Austin |
| 5,074,044 A | 12/1991 | Duncan et al. |
| 5,084,972 A | 2/1992 | Waugh |
| 5,105,585 A | 4/1992 | Hampl et al. |
| 5,125,190 A | 6/1992 | Buser et al. |
| 5,131,192 A | 7/1992 | Cheng |
| 5,163,252 A | 11/1992 | Garner et al. |
| 5,167,215 A | 12/1992 | Harding, Jr. |
| 5,170,588 A | 12/1992 | Schaal |
| 5,176,408 A | 1/1993 | Pedersen |
| 5,201,785 A | 4/1993 | Nagano |
| 5,237,781 A | 8/1993 | Demetrius |
| 5,259,087 A | 11/1993 | Loveless et al. |
| 5,305,729 A | 4/1994 | Chiuminatta et al. |
| 5,319,889 A | 6/1994 | Rudolf et al. |
| 5,327,649 A | 7/1994 | Skinner |
| 5,339,571 A | 8/1994 | Timmons et al. |
| 5,381,780 A | 1/1995 | Yelton et al. |
| 5,411,433 A | 5/1995 | Keller |
| 5,435,066 A | 7/1995 | Bare |
| 5,440,809 A | 8/1995 | Padilla |
| 5,445,056 A | 8/1995 | Folci |
| 5,527,207 A | 6/1996 | Azar et al. |
| 5,545,082 A | 8/1996 | Courson et al. |
| 5,558,571 A | 9/1996 | Toyoshima et al. |
| 5,564,408 A | 10/1996 | Bassols |
| 5,566,457 A | 10/1996 | Batschari et al. |
| 5,575,035 A | 11/1996 | Reis et al. |
| D376,526 S | 12/1996 | Hepburn |
| 5,582,225 A | 12/1996 | Schank |
| 5,588,213 A | 12/1996 | Swanberg |
| 5,609,516 A | 3/1997 | Courson et al. |
| 5,637,034 A | 6/1997 | Everts et al. |
| 5,653,561 A | 8/1997 | May |
| 5,662,440 A | 9/1997 | Kikuchi |
| 5,675,895 A | 10/1997 | Mori et al. |
| 5,680,704 A | 10/1997 | Okubo |
| 5,688,082 A | 11/1997 | Richardson |
| 5,704,956 A | 1/1998 | Loveless et al. |
| 5,713,785 A | 2/1998 | Nishio |
| D392,531 S | 3/1998 | Richardson |
| 5,774,992 A | 7/1998 | Lindenmuth |
| 5,791,979 A | 8/1998 | Duncan et al. |
| 5,815,933 A | 10/1998 | Staniszewski |
| 5,816,733 A | 10/1998 | Ishikawa et al. |
| 5,819,619 A | 10/1998 | Miller et al. |
| 5,833,524 A | 11/1998 | Satoh et al. |
| 5,931,072 A | 8/1999 | Shibata |
| 5,941,765 A | 8/1999 | Taylor |
| 5,954,863 A | 9/1999 | Loveless et al. |
| 6,019,433 A | 2/2000 | Allen |
| 6,027,399 A | 2/2000 | Stewart |
| 6,053,674 A | 4/2000 | Thompson |
| 6,108,912 A | 8/2000 | Radigan |
| 6,112,736 A | 9/2000 | Bearden |
| 6,138,317 A | 10/2000 | Holmes et al. |
| 6,167,626 B1 | 1/2001 | Doumani et al. |
| 6,183,527 B1 | 2/2001 | O'Banion et al. |
| 6,219,922 B1 | 4/2001 | Campbell et al. |
| 6,230,411 B1 | 5/2001 | Wall |
| 6,273,081 B1 | 8/2001 | Gorgol et al. |
| 6,318,352 B1 | 11/2001 | Gnazzo et al. |
| 6,347,985 B1 | 2/2002 | Loveless |
| 6,349,712 B1 | 2/2002 | Halstead |
| D456,234 S | 4/2002 | Keller |
| D456,685 S | 5/2002 | Keller |
| D458,825 S | 6/2002 | Keller et al. |
| 6,412,179 B1 | 7/2002 | Ende |
| 6,470,778 B1 | 10/2002 | Kaye, Jr. et al. |
| 6,471,574 B1 | 10/2002 | Rupprecht et al. |
| 6,557,261 B1 | 5/2003 | Buser et al. |
| 6,568,088 B1 | 5/2003 | Ende |
| 6,648,742 B1 | 11/2003 | Segiel |
| 6,651,343 B2 | 11/2003 | Laren et al. |
| 6,678,960 B2 | 1/2004 | Williams |
| 6,679,145 B1 | 1/2004 | Lee |
| 6,699,114 B1 | 3/2004 | Booeshaghi et al. |
| 6,726,554 B1 | 4/2004 | Chen et al. |
| 6,748,660 B2 | 6/2004 | Buser et al. |

(56) References Cited

U.S. PATENT DOCUMENTS

| | | |
|---|---|---|
| 6,786,556 B2 | 9/2004 | Due |
| 6,796,208 B1 | 9/2004 | Jorgensen |
| 6,811,476 B2 | 11/2004 | Ohlendorf |
| 6,823,907 B2 | 11/2004 | Cheng |
| D499,946 S | 12/2004 | Stirm |
| 6,827,640 B2 | 12/2004 | Bures et al. |
| 6,830,113 B2 | 12/2004 | Moore et al. |
| 6,860,799 B2 | 3/2005 | Loveless |
| 6,878,050 B2 | 4/2005 | Wendt et al. |
| 6,886,441 B2 | 5/2005 | Hamilton |
| 6,887,146 B2 | 5/2005 | Staas |
| 6,896,604 B1 | 5/2005 | Taylor |
| 6,896,605 B2 | 5/2005 | Ohlendorf |
| 6,902,594 B2 | 6/2005 | Cho |
| 6,935,939 B1 | 8/2005 | Buser et al. |
| 6,948,412 B2 | 9/2005 | Brazell et al. |
| 6,960,124 B2 | 11/2005 | Lee |
| D513,161 S | 12/2005 | Chilton |
| 6,988,939 B2 | 1/2006 | Hoffmann et al. |
| 6,997,653 B2 | 2/2006 | Styles |
| 7,000,605 B2 | 2/2006 | Due |
| 7,013,884 B2 | 3/2006 | Guth |
| 7,014,547 B2 | 3/2006 | Kleider |
| 7,044,039 B2 | 5/2006 | Powell |
| 7,044,843 B1 | 5/2006 | Lin |
| 7,047,647 B1 | 5/2006 | Muller |
| 7,047,650 B2 | 5/2006 | Chen |
| 7,069,831 B2 | 7/2006 | Chang |
| 7,112,005 B2 | 9/2006 | Due |
| 7,159,323 B2 | 1/2007 | Petrenko |
| 7,171,880 B2 | 2/2007 | Powell |
| D537,691 S | 3/2007 | Lamprecht et al. |
| D537,692 S | 3/2007 | Aglassinger |
| 7,195,429 B2 | 3/2007 | Dods et al. |
| 7,197,826 B2 | 4/2007 | Baxivanelis |
| 7,198,559 B2 | 4/2007 | Walstrum et al. |
| 7,204,178 B2 | 4/2007 | Bergmann |
| 7,216,572 B2 | 5/2007 | Keenan |
| 7,222,560 B2 | 5/2007 | Parks et al. |
| 7,223,161 B2 | 5/2007 | Kodani et al. |
| 7,249,914 B2 | 7/2007 | Due |
| D553,933 S | 10/2007 | Esenwein |
| 7,296,356 B2 | 11/2007 | Ngan |
| 7,300,337 B1 | 11/2007 | Sun et al. |
| 7,322,429 B2 | 1/2008 | Kim |
| 7,438,629 B2 | 10/2008 | Bosten et al. |
| 7,438,633 B2 | 10/2008 | Jespersen |
| D593,389 S | 6/2009 | Clayton |
| 7,578,063 B2 | 8/2009 | Martin |
| 7,625,265 B2 | 12/2009 | Woods et al. |
| 7,628,682 B2 | 12/2009 | Andrasic et al. |
| 7,635,293 B2 | 12/2009 | Sun et al. |
| 7,661,194 B1 | 2/2010 | Ende |
| 7,661,195 B1 | 2/2010 | Wood |
| D614,678 S | 4/2010 | Jorgensen et al. |
| 7,740,086 B2 | 6/2010 | Bleicher et al. |
| 7,797,794 B2 | 9/2010 | Bleicher et al. |
| 7,805,805 B2 | 10/2010 | Loveless |
| 7,887,624 B2 | 2/2011 | Ekstrom et al. |
| 7,892,075 B2 | 2/2011 | Esenwein |
| 7,958,641 B1 | 6/2011 | Ende |
| 7,985,042 B1 | 7/2011 | Paxton |
| 8,011,398 B2 | 9/2011 | Loveless |
| 8,061,344 B2 * | 11/2011 | Dofher .................. B28D 7/02 |
| | | 125/13.01 |
| 8,133,094 B2 | 3/2012 | Loveless |
| 8,137,165 B2 | 3/2012 | Loveless |
| 8,177,606 B2 | 5/2012 | Loveless |
| 8,181,559 B1 | 5/2012 | Ende |
| 8,209,872 B1 | 7/2012 | Ende |
| 8,381,711 B2 * | 2/2013 | Loveless ............. B23D 59/006 |
| | | 125/13.01 |
| D677,139 S | 3/2013 | Yamamoto |
| D677,545 S | 3/2013 | Sell |
| D677,547 S | 3/2013 | Rosenau |
| D677,548 S | 3/2013 | Rosenau |
| D678,028 S | 3/2013 | Rosenau |
| 8,409,310 B2 | 4/2013 | Despineux et al. |
| D687,195 S | 7/2013 | Sell |
| 8,523,637 B2 | 9/2013 | Loveless |
| 8,561,512 B2 | 10/2013 | Loveless |
| 8,662,964 B2 | 3/2014 | Hiller |
| 8,702,478 B2 | 4/2014 | Loveless et al. |
| 8,740,674 B2 | 6/2014 | Esenwein |
| D711,717 S | 8/2014 | Walz et al. |
| D717,844 S | 11/2014 | Cappuccio |
| D719,806 S | 12/2014 | Wiedemann |
| 8,967,922 B2 | 3/2015 | Yoshikane et al. |
| 8,978,781 B2 | 3/2015 | Burdick et al. |
| 9,027,542 B2 | 5/2015 | Ronzello |
| 9,038,275 B2 | 5/2015 | Jensen et al. |
| 9,073,228 B2 * | 7/2015 | Inayoshi ................ B26D 7/27 |
| D736,582 S | 8/2015 | Dietsche |
| 9,101,993 B2 | 8/2015 | Yokota et al. |
| D741,557 S | 10/2015 | Young |
| D742,081 S | 10/2015 | Young |
| D742,710 S | 11/2015 | Wiedemann |
| D743,230 S | 11/2015 | Wiedemann |
| 9,440,344 B2 | 9/2016 | Ikuta et al. |
| D774,865 S | 12/2016 | Chen |
| 9,555,554 B2 | 1/2017 | Thorson et al. |
| 9,573,286 B2 * | 2/2017 | Gantke ............... B23D 45/048 |
| D793,456 S | 8/2017 | Lindsay |
| D800,804 S | 10/2017 | Cappuccio |
| 9,776,296 B2 | 10/2017 | Brewster |
| 9,937,638 B2 | 4/2018 | Numata |
| D816,453 S | 5/2018 | Hansen et al. |
| 10,035,240 B2 | 7/2018 | Buser |
| 10,045,671 B2 | 8/2018 | Wiedemann et al. |
| D853,814 S | 7/2019 | Koeniger et al. |
| 10,800,003 B2 | 10/2020 | Moller |
| 2001/0023168 A1 | 9/2001 | Wuensch |
| 2002/0002774 A1 * | 1/2002 | Onose .................. B23D 59/006 |
| | | 30/124 |
| 2002/0104416 A1 * | 8/2002 | Brickner, Jr. .......... B27G 19/02 |
| | | 83/100 |
| 2002/0144405 A1 * | 10/2002 | Moore ...................... B27B 9/00 |
| | | 30/123 |
| 2002/0189415 A1 * | 12/2002 | Oktavec ............. B23Q 11/0046 |
| | | 83/98 |
| 2003/0032381 A1 | 2/2003 | Dutterer |
| 2003/0104767 A1 | 6/2003 | Chilton |
| 2003/0127904 A1 | 7/2003 | Due |
| 2003/0213482 A1 * | 11/2003 | Buser ................. B23Q 11/0046 |
| | | 125/12 |
| 2003/0220060 A1 | 11/2003 | Bures |
| 2004/0107584 A1 * | 6/2004 | Yoshida ............... B23Q 11/005 |
| | | 30/391 |
| 2004/0206220 A1 | 10/2004 | Keenan |
| 2005/0088866 A1 | 4/2005 | Levine |
| 2005/0103172 A1 * | 5/2005 | Bohne .................... B27G 19/04 |
| | | 83/168 |
| 2005/0155233 A1 | 7/2005 | Chen |
| 2005/0287938 A1 | 12/2005 | Kodani |
| 2006/0005681 A1 | 1/2006 | Lambert et al. |
| 2006/0019585 A1 | 1/2006 | Zayat |
| 2006/0067798 A1 * | 3/2006 | Neumeier ............. B24B 55/102 |
| | | 407/66 |
| 2006/0086350 A1 | 4/2006 | Due |
| 2006/0107810 A1 * | 5/2006 | Chiu .................. B23D 59/006 |
| | | 83/100 |
| 2006/0147266 A1 | 7/2006 | Due |
| 2006/0266184 A1 | 11/2006 | Hetcher |
| 2007/0017191 A1 * | 1/2007 | Miller ................. B23D 59/006 |
| | | 55/385.1 |
| 2007/0017197 A1 | 1/2007 | Miller et al. |
| 2007/0079589 A1 | 4/2007 | Ekstrom et al. |
| 2007/0155296 A1 | 7/2007 | Hofmann et al. |
| 2007/0178815 A1 | 8/2007 | Buser |
| 2007/0193759 A1 | 8/2007 | Sweig et al. |
| 2007/0226948 A1 | 10/2007 | Due |
| 2007/0228805 A1 | 10/2007 | Due |
| 2007/0251104 A1 | 11/2007 | Heinrichs |

(56) References Cited

U.S. PATENT DOCUMENTS

| | | |
|---|---|---|
| 2008/0053282 A1 | 3/2008 | Chen |
| 2008/0060631 A1 | 3/2008 | Dofher |
| 2008/0099053 A1 | 5/2008 | Loveless |
| 2008/0104936 A1 | 5/2008 | Kellermann |
| 2008/0109986 A1 | 5/2008 | Loveless |
| 2008/0110527 A1 | 5/2008 | Kuo |
| 2008/0146125 A1 | 6/2008 | Loveless |
| 2008/0163492 A1 | 7/2008 | Johansson |
| 2008/0200103 A1 | 8/2008 | Esenwein |
| 2008/0244910 A1 | 10/2008 | Patel |
| 2008/0271323 A1 | 11/2008 | Perlmutter |
| 2008/0276776 A1* | 11/2008 | Kani ............... B23D 59/006 83/147 |
| 2009/0181604 A1 | 7/2009 | Loveless |
| 2009/0181605 A1 | 7/2009 | Loveless |
| 2009/0181606 A1 | 7/2009 | Loveless |
| 2009/0183377 A1* | 7/2009 | Loveless ............ B23D 59/006 30/390 |
| 2009/0183800 A1 | 7/2009 | Loveless |
| 2009/0186559 A1 | 7/2009 | Loveless |
| 2009/0241283 A1 | 10/2009 | Loveless |
| 2009/0298403 A1 | 12/2009 | Yamashiro |
| 2009/0311953 A1 | 12/2009 | Maute et al. |
| 2010/0005619 A1 | 1/2010 | Loveless |
| 2010/0058911 A1 | 3/2010 | Goddard |
| 2010/0170538 A1 | 7/2010 | Baker et al. |
| 2010/0242209 A1* | 9/2010 | Beskow ............... A47L 5/24 15/329 |
| 2010/0269353 A1 | 10/2010 | Martin |
| 2010/0285729 A1 | 11/2010 | Loveless |
| 2010/0313867 A1 | 12/2010 | Loveless |
| 2011/0021121 A1 | 1/2011 | Loveless |
| 2011/0185581 A1 | 8/2011 | Xing et al. |
| 2011/0192262 A1 | 8/2011 | Loveless |
| 2012/0084986 A1 | 4/2012 | Klawitter |
| 2012/0121354 A1 | 5/2012 | Dickey |
| 2012/0184193 A1 | 7/2012 | Numata |
| 2012/0186520 A1 | 7/2012 | Hill |
| 2013/0104714 A1 | 5/2013 | Dammertz et al. |
| 2013/0198996 A1 | 8/2013 | King |
| 2014/0215752 A1 | 8/2014 | Loveless |
| 2014/0260848 A1 | 9/2014 | Gantke et al. |
| 2014/0329447 A1 | 11/2014 | Copeland |
| 2014/0352106 A1 | 12/2014 | King |
| 2016/0031054 A1 | 2/2016 | Chang |
| 2016/0184963 A1 | 6/2016 | Melancon |
| 2016/0368166 A1 | 12/2016 | Numata et al. |
| 2017/0144096 A1 | 5/2017 | Chen |
| 2017/0225358 A1 | 8/2017 | Carlsson |
| 2018/0009132 A1* | 1/2018 | Merck ............... B28D 7/02 |
| 2018/0071845 A1* | 3/2018 | Hansen ............ B23D 59/006 |
| 2018/0169885 A1 | 6/2018 | Okouchi |
| 2018/0236574 A1* | 8/2018 | Kume ............... B23D 59/006 |
| 2019/0125153 A1 | 5/2019 | Loveless |
| 2020/0122294 A1 | 4/2020 | Loveless |
| 2020/0139508 A1 | 5/2020 | Ohlendorf |

FOREIGN PATENT DOCUMENTS

| | | | |
|---|---|---|---|
| EP | 0 579 964 | 1/1994 | |
| GB | 2 260 721 | 4/1993 | |
| GB | 2 262 159 | 6/1993 | |
| JP | 02-122755 | 2/1990 | |
| JP | H 06-278103 | 10/1994 | |
| JP | 10-000559 | 1/1998 | |
| JP | 10-015717 | 1/1998 | |
| JP | 2001-96525 | 4/2001 | |
| JP | 3128896 | 1/2007 | |
| JP | 2018187768 A * | 11/2018 | ............ B23D 47/00 |
| KR | 10-2002-0056086 | 7/2002 | |
| WO | WO 99/44786 | 9/1999 | |

* cited by examiner

CIRCULAR SAW DUST COLLECTION SHROUD

PRIORITY

The present application claims the benefit of U.S. Provisional Application Ser. No. 62/824,406, filed Mar. 27, 2019, which is herein incorporated by reference in its entirety.

THE FIELD OF THE INVENTION

The present invention relates to dust collection. In particular, examples of the present invention relates to a dust collection shroud for collecting dust during use of a circular saw.

BACKGROUND

Dust collection has become increasingly important both for commercial use and construction as well as for consumer or hobbyist use of power tools. Without adequate dust collection while working, dust and debris is typically scattered over a wide area. It is desirable to contain the dust and debris which is created while using power tools for several reasons. It is desirable to contain the dust and debris to keep the workplace cleaner and to minimize the time necessary to clean up afterwards. For example, circular saws are often used to cut wood, plastics, or masonry products. Cutting these materials creates fine dust which is spread over a large distance and which can be difficult and time consuming to clean up afterwards. It is also desirable to contain the dust and debris to keep the debris from getting into the tool itself, as the fine dust often causes premature failure of the tool bearings, motor, etc. Additionally, dust poses a health risk to the machine operator and others who may breathe it. It is thus desirable to collect the dust to minimize exposure to the dust.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
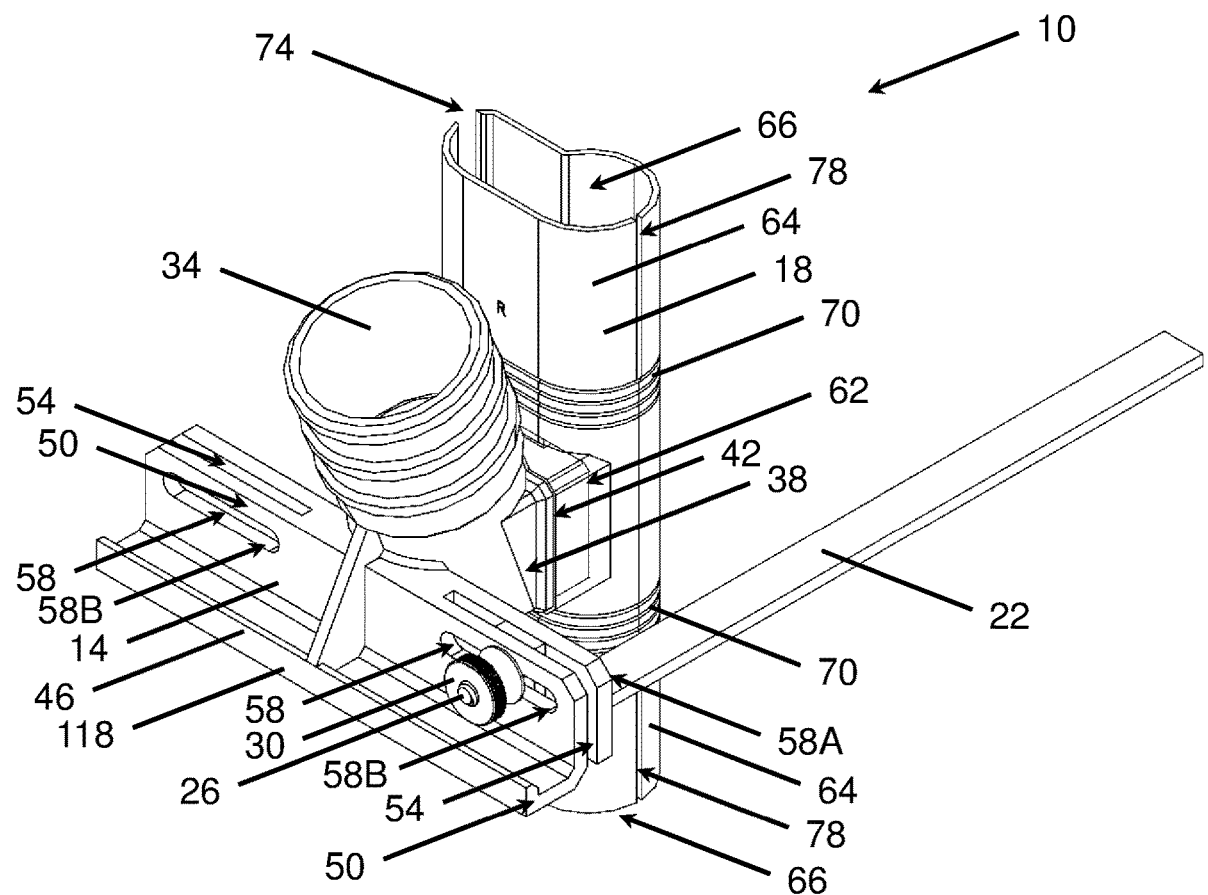
FIG. 1 is a drawing which shows an isometric view of the dust shroud.

Corresponding reference characters indicate corresponding components throughout the several views of the drawings. Unless otherwise noted, the drawings have been drawn to scale. Skilled artisans will appreciate that elements in the figures are illustrated for simplicity and clarity. For example, the dimensions of some of the elements in the figures may be exaggerated relative to other elements to help improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which are shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

As used herein, "adjacent" refers to near or close sufficient to achieve a desired effect. Although direct contact is common, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be such as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a number or numerical range endpoint by providing that a given value may be "a little above" or "a little below" the number or endpoint.

The disclosure particularly describes a dust collection shroud for a circular saw. Particularly, the present disclosure describes a dust collection shroud which may be universally adapted to fit many different circular saws. The dust collection shroud attaches to or adjacent to the base of the circular saw and provides a dust collection chamber which extends around the front of the circular saw blade within the blade guard. The dust collection shroud may be attached to both left and right handed saws. The shroud includes a hood which extends around the saw blade. The hood forms much of the dust collection chamber around the blade. In some cases, the hood may be trimmed to better fit individual saws. The dust collection chamber collects dust at the dust creation point of the saw. A majority of the dust is collected before it escapes the saw or migrates to other areas. A vacuum hose port and a vacuum hose are used to connect the dust collection shroud to a vacuum and draw air from around the front of the blade and from the dust collection chamber.

Referring now to FIG. 1, an isometric drawing of the dust collection shroud 10 is shown. The shroud 10 includes a shroud body 14, a saw blade hood 18, a mounting bar 22, a bolt 26, and a thumb nut 30. The shroud body 14 includes a vacuum port 34 which extends upwardly from a base of the shroud body 14 and generally outwardly from the shroud body 14. This orientation may be varied somewhat. The vacuum port 34 provides an opening which receives a standard 1.25 or 1.5 inch vacuum hose to thereby connect the dust collection shroud 10 to a vacuum such as a shop canister vacuum. In some applications, the vacuum port 34 may include an extended hose which extends further upwardly from the dust collection shroud 10 and provides an opening to receive the vacuum hose. The lumen of the vacuum port 34 is pneumatically connected to a dust collection chamber/passage 38 which is formed by the shroud body 14. The dust collection chamber 38 receives dust from the circular saw and transmits the dust through the vacuum port to be collected by a vacuum.

The dust collection chamber 38 includes an opening, indicated at 42, which interfaces with the saw blade hood 18. The saw blade hood 18 attaches to the shroud body 14 and extends around the circular saw blade. Accordingly, the saw blade hood 18 forms a portion of the dust collection chamber 38. The shroud body 14 also includes a mounting flange 46 which extends generally horizontally from the shroud body 14. The mounting flange 46 is used to attach the dust collection shroud 10 to a circular saw via the rip slot on the circular saw. The mounting flange 46 is designed to allow for left or right mounting of the dust collection shroud 10 to a left or right handed circular saw. This increases the ability to mount a single dust collection shroud 10 to many different circular saws. Accordingly, the mounting flange includes mirrored mounting portions 50 which extend both forwards and backwards from the center of the shroud body 14.

A single mounting portion 50 is generally used to attach the dust collection shroud 10 to a circular saw. Each mounting portion 50 includes a slot 54 which can receive a mounting bar 22. The mounting bar 22 is an elongate rectangular bar with an upturned end; forming an "L" shape. The upturned end of the mounting bar 22 includes a hole which receives the mounting bolt 26. Each mounting portion 50 of the shroud body mounting flange 46 has a bolt slot 58 formed therethrough which also receives the mounting bolt 26. As the bolt slot 58 intersects the mounting bar slot 54, the bolt slot 58 is formed with a rear bolt slot portion 58A and a front bolt slot portion 58B. The rear bolt slot portion 58A is formed with square ends to receive the squared shoulder of a carriage bolt. The front bolt slot portion 58B is formed with rounded ends to receive the carriage bolt shank. The upturned "L" shaped end of the mounting bar 22 is placed into the mounting bar slot 54 and the mounting carriage bolt 26 is passed through the rear bolt slot 58A, the bolt hole in the mounting bar 22, and through the front bolt slot 58B. The thumb nut 30 is then secured on the threaded end of the bolt 26 to fix the mounting bar 22 in a desired position on the mounting flange 46. The dust collection shroud 10 is shown ready for attachment to a right handed circular saw. Generally, the dust collection shroud 10 may be attached to a left handed circular saw with the mounting bar 22 attached to the other mounting portion 50 of the mounting flange 46.

The saw blade hood 18 is also made for use with a left or right handed circular saw. The saw blade hood 18 includes a central opening 62 which attaches to the shroud body 14 and includes upper and lower portions 64 which define an open channel 66 for the saw blade. The example upper and lower portions 64 are symmetrical and they extend upwardly and downwardly from the opening 62. The assembly shown is configured for a right handed circular saw. For use on a left handed saw, the saw blade hood 18 would be inverted to place the central opening on the opposite side of the hood 18 and the shroud body 14 would be rotated 180 degrees about a vertical axis. The mounting bar would be attached to the other mounting portion 50.

The upwardly extending end of the saw blade hood 64 will extend into the blade guard of the circular saw. The downwardly extending end 64 of the saw blade hood 66 will extend downwardly past the bottom of the saw base plate. The saw blade hood 18 includes molded-in cut lines 70 on both upper/lower ends 64 of the blade hood 18 which guide a user in cutting off the excess downwardly extending portion of the saw blade end 64 while initially installing the dust collection shroud on a circular saw. The saw blade hood end portions 64 are formed with a blade slot 74 that extends vertically along the rear of the blade channel 66. The saw blade hood end portions 64 are also formed with a compression/flexibility slot 78 along the front side of the upwardly and downwardly extending ends 64 of the hood 18. This compression slot 78 helps the upwardly extending end 64 of the hood 18 to conform to the saw blade shroud. The saw blade hood 18 is molded from a flexible material which is still somewhat rigid to allow conformation to the saw blade guard. The saw blade hood 18 may be molded from a clear plastic material, such as clear vinyl, to improve visibility of the saw blade when the circular saw is in use. Similarly, the shroud body 14 may be molded from a clear plastic such as acrylic or polycarbonate to further increase the visibility of the saw blade.

Figure 2A:
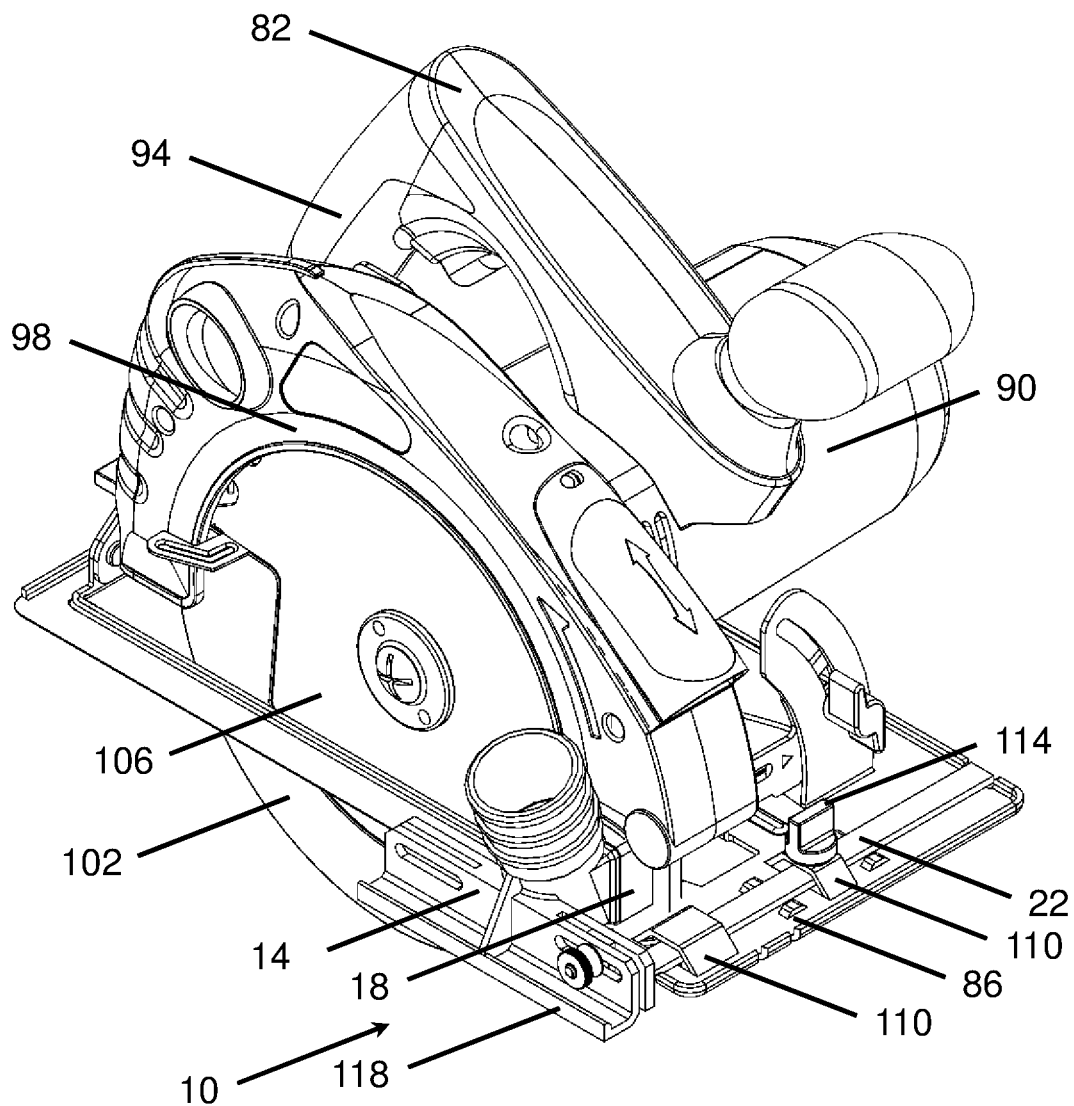
FIG. 2A is a drawing which shows an isometric view of the dust shroud mounted to a circular saw.

FIG. 2A shows a drawing of the dust collection shroud 10 attached to a circular saw 82. The circular saw 82 includes a base plate 86 which contacts a material being cut by the saw. The saw 82 also includes a motor 90, hand grip 94, upper blade guard 98, lower movable blade guard 102, and blade 106. Other parts of the circular saw 82 which do not directly interface with the dust collection shroud 10 are not individually numbered. The saw base plate 86 includes mounting bosses 110 which may be used to attach a rip fence to the saw 82. Circular saws 82 often have similarly situated mounting bosses 110 for using a rip cutting guide. Depending on the particular circular saw 82, the mounting bosses 110 may be channels, brackets, or openings which are used to receive the mounting bar 22. The rip fence is not commonly used and is not used while the dust collection shroud 10 is used. The mounting bosses 110 extend upwardly from the base plate 86 and form openings oriented laterally across the saw base plate 86. The dust shroud mounting bar 22 is placed through the mounting bosses 110 and a screw, such as thumb screw 114, is used to secure the mounting bar 22 to the saw base plate 86.

The mounting bar 22 is moveable laterally in the mounting bosses 110; allowing the lateral position of the dust collection shroud 10 to be adjusted to properly position the saw blade hood 18 in the upper blade guard 98 and around the saw blade 106. Additionally, the shroud body 14 is movable forwards and backwards relative to the mounting bar 22 via the slot 54, bolt slots 58, bolt 26, and nut 30 in order to properly position the shroud 10 relative to the front of the blade 106 and the upper blade guard 98. As shown, the downwardly extending portion of the blade channel 66 has been cut so that it does not extend down below the base plate 86 and the upwardly extending portion of the blade channel 66 is positioned inside of the upper blade guard 98. The shroud body 14 is formed with a straight vertical outer edge 118 along the outside of the mounting flange 46. This straight outer edge 118 may be used as a cutting guide by positioning the outer edge 118 against a fence which has been clamped to a material for cutting along a line in that material.

When the dust collection shroud is installed on a circular saw as shown in FIG. 2, the dust collection chamber 38 is positioned adjacent the front of the saw blade 106 and adjacent the saw base plate 86. This positions the dust collection chamber 38 adjacent the point where dust is generated while cutting. The saw blade hood 18 extends around the front of the saw blade 106 and is positioned close to the front of the upper blade guard 98. The dust collection shroud 10 both collects a majority of dust near the point of dust generation and keeps dust contained within the saw upper blade guard 98; reducing the amount of dust which is spread into the environment during use of the circular saw 82.

Figure 2B:
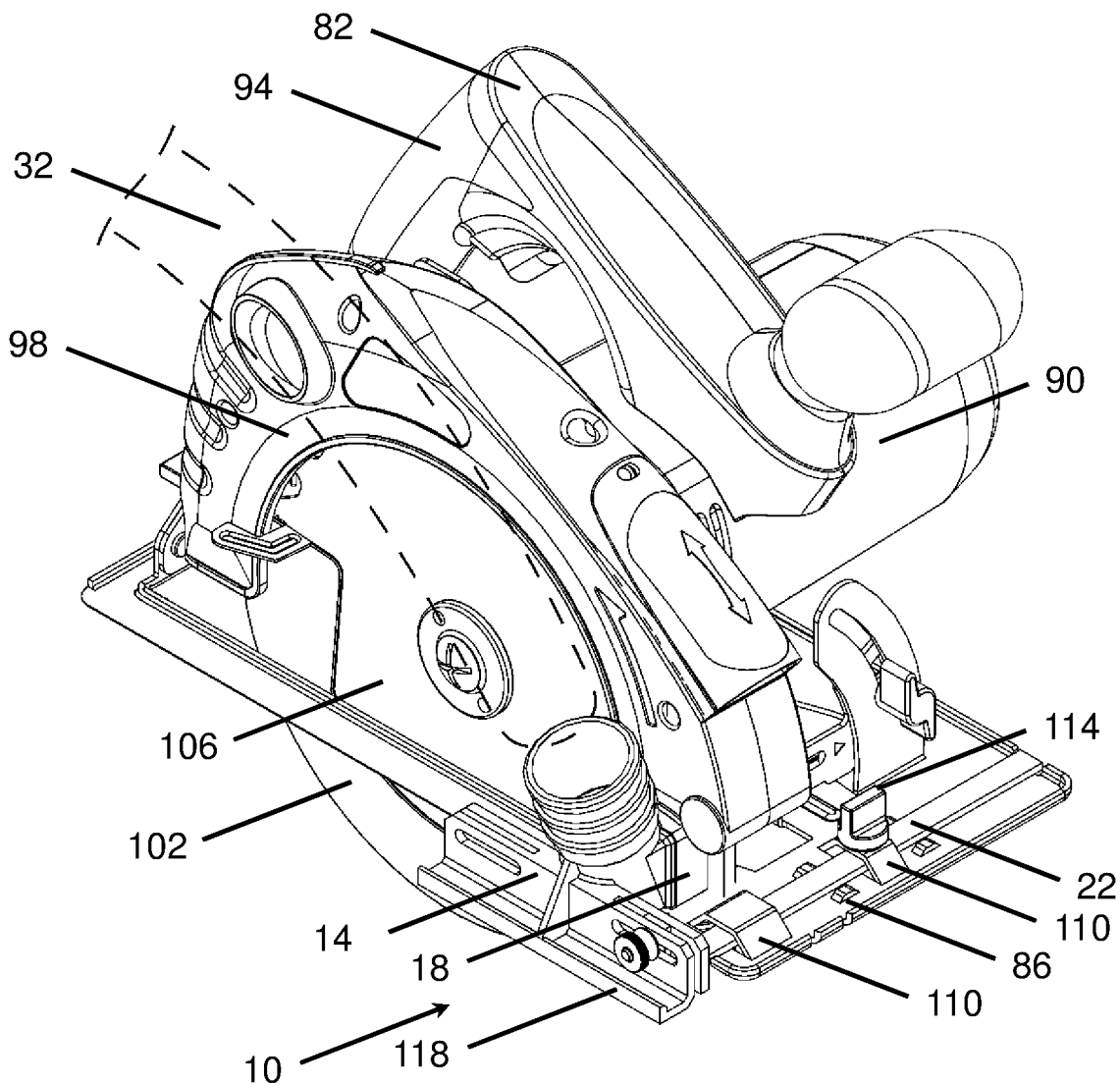
FIG. 2B is a drawing which shows an isometric view of the dust shroud mounted to a circular saw.
Figure 2C:
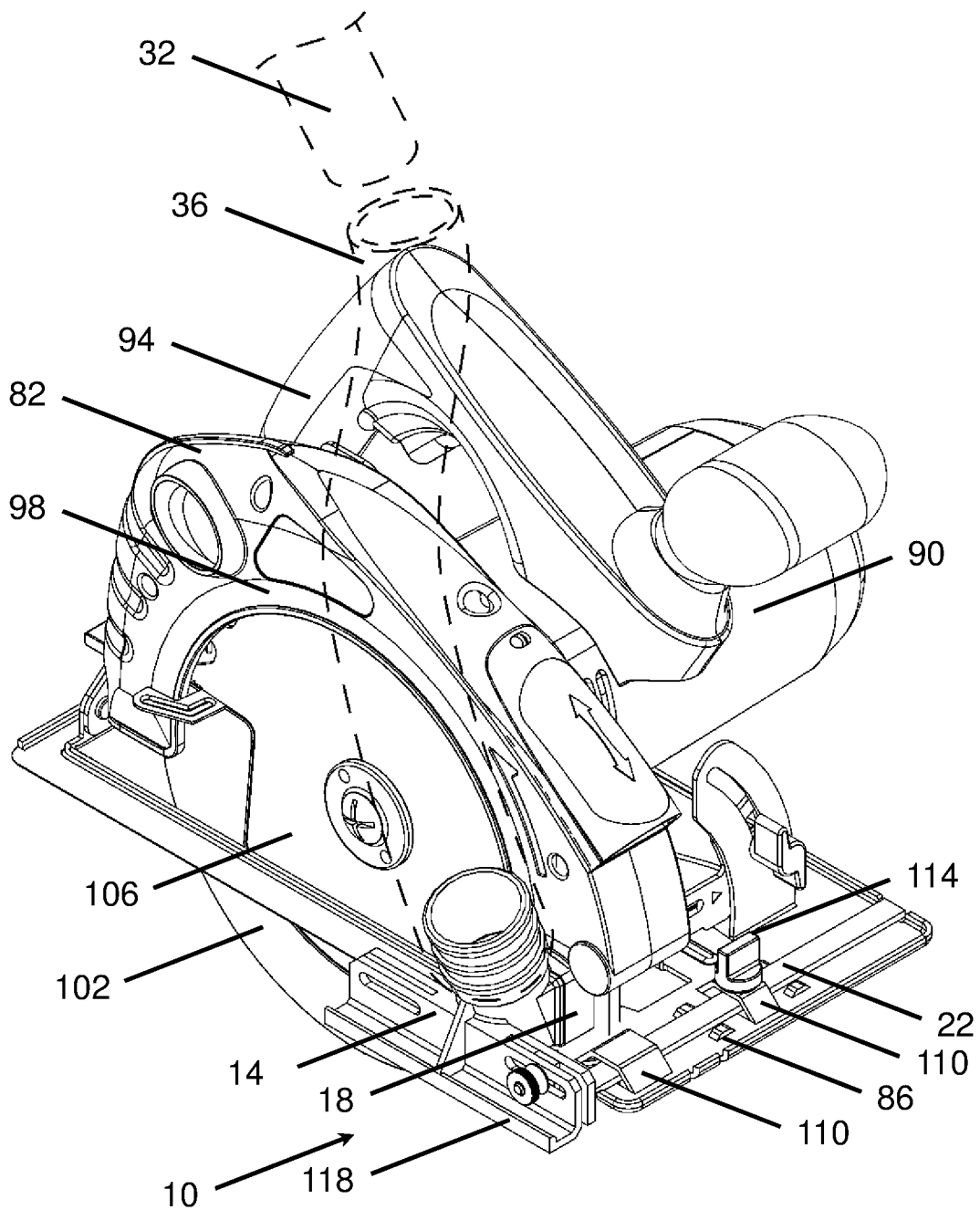
FIG. 2C is a drawing which shows an isometric view of the dust shroud mounted to a circular saw.

FIG. 2B shows how a vacuum hose 32 (dashed lines) may be attached to the dust collection shroud 10 to collect the dust produced while using the circular saw 82. Similarly, FIG. 2C shows how a vacuum hose adapter 36 (dashed lines) may be used to connect a vacuum hose 32 (dashed lines) to the dust collection shroud 10. The vacuum hose adapter 36 may be used to connect a different diameter of vacuum hose 32 or to provide a more rigid section of the vacuum conduit adjacent to the saw body if this makes it easier to use the circular saw 82.

Figure 3:
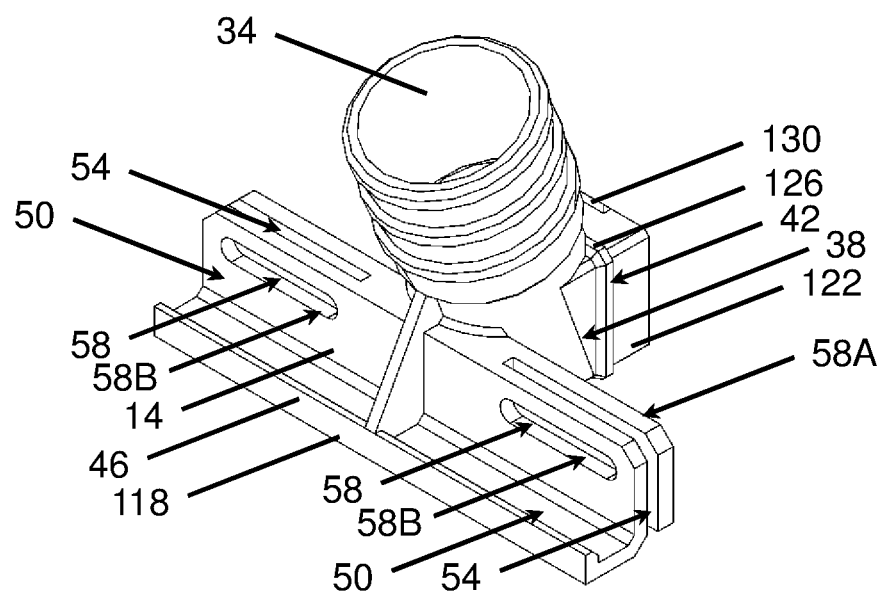
FIG. 3 is a drawing which shows an isometric view of the shroud body.
Figure 4:
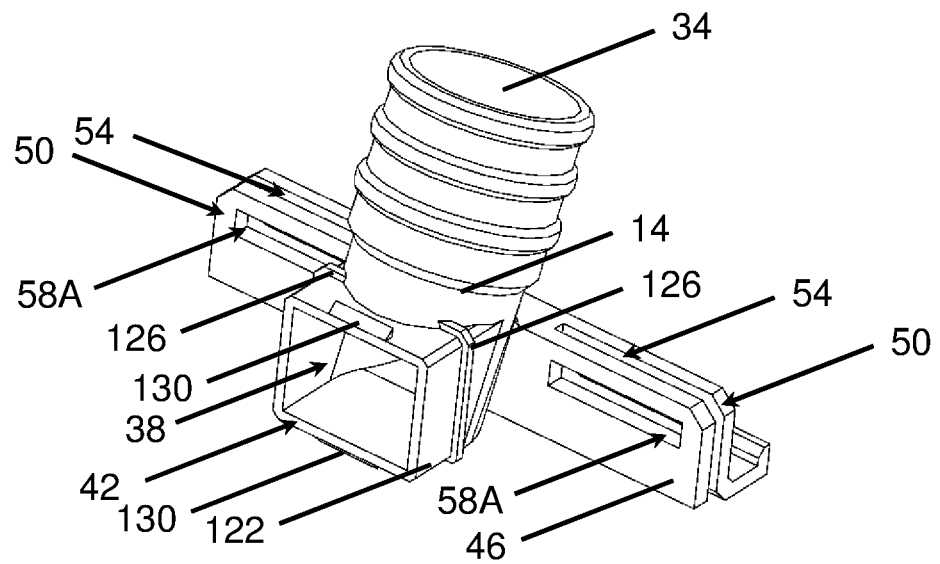
FIG. 4 is a drawing which shows an isometric view of the shroud body.

FIGS. 3 and 4 show drawings of the shroud body 14. FIG. 3 shows an isometric view of the shroud body 14 from the position shown in FIGS. 1 and 2. FIG. 4 shows a view of the shroud body 14 from the opposite side to better illustrate the interior of the dust collection chamber 38. FIG. 4 better illustrates how the vacuum port 34 is connected to the dust collection chamber. The vacuum port 34 may include external ribs that may serve to strengthen the vacuum port or to allow attachment of an intermediate hose between the vacuum port 34 and the vacuum hose. The external ribs may allow the vacuum port to accept an adapter for a 1.5 inch vacuum hose, or to alternately receive a 1.5 inch vacuum hose directly. The external ribs may be sized so that a 1.5 inch vacuum hose fits snugly over the ribs. A lower rib may be larger and provide a depth stop which keeps a 1.5 inch vacuum hose from sliding too far over the vacuum port 34. The vacuum port 34 generally extends upwardly from a base of the shroud body 14 and generally outwardly from the shroud body 14 away from the saw blade 106. This orientation is generally suitable for connection to a vacuum hose while preserving ease of operation for the circular saw 82. The dust collection chamber 38 extends generally inwardly from the shroud body towards the saw blade 106 and is connected to the vacuum port 34 so that a continuous pneumatic conduit is formed to transport dust from the dust collection chamber 38, through the vacuum port 34, and into a vacuum hose. In the example shroud body 14, the opening 42 of the dust collection chamber 38 at the inward side is rectangular in shape and the pneumatic conduit between the opening of the vacuum port 34 and the opening 42 of the dust collection chamber transitions between a round opening to a rectangular opening. The rectangular opening 42 of the dust collection chamber 38 helps to align the saw blade hood 18 and prevent rotation of the saw blade hood 18.

A saw blade hood mounting flange 122 corresponding to the dust collection chamber 38 is formed around the opening 42. The mounting flange 122 accepts the saw blade hood 18 and attaches the saw blade hood 18 to the shroud body 14. The mounting flange 122 includes a wall 126 which functions as a depth stop for the saw blade hood 18. The mounting flange 122 also includes two ramp shaped retaining tabs 130 which engage corresponding shaped and positioned recesses/openings in the saw blade hood 18. The saw blade hood 18 is held in position by the wall 126 and retaining tabs 130 and is held securely relative to the shroud body 14 in a desired position relative to the circular saw blade 106.

The saw mounting flange 46 extends generally horizontally from the shroud body 14 a sufficient distance to allow some forwards and backwards positioning of the dust collection shroud 10 relative to the circular saw 82. Each of the mirrored mounting portions 50 extends either forwards or backwards from the center of the shroud body 14 and one of these mounting portions 50 may be used to mount the dust collection shroud to a circular saw, depending on the saw configuration; e.g. left or right handed.

A single mounting portion 50 is generally used to attach the dust collection shroud 10 to a circular saw via the mounting bar 22. The slot 54 extends vertically through the mounting portion 50 since the corresponding end of the mounting bar 22 is bent upwardly in an "L" shape. If the mating end of the mounting bar 22 was left flat, the slot 54 may be omitted and the bolt slot 58 may be oriented vertically through a bottom flange of the mounting portion 50. The example configuration, however, fixes the shroud body 10 in rotation about a horizontal plane as the end of the mounting bar 22 is held against the sides of the slot 54. FIG. 4 shows how the rear bolt slot portion 58A of the bolt slot 58 is formed with square ends to receive the squared shoulder of a carriage bolt. Alternatively, the rear bolt slot portion 58A may be formed with rounded ends and the slot may be longer so that the bolt shoulder does not contact the slot ends.

Figure 5:
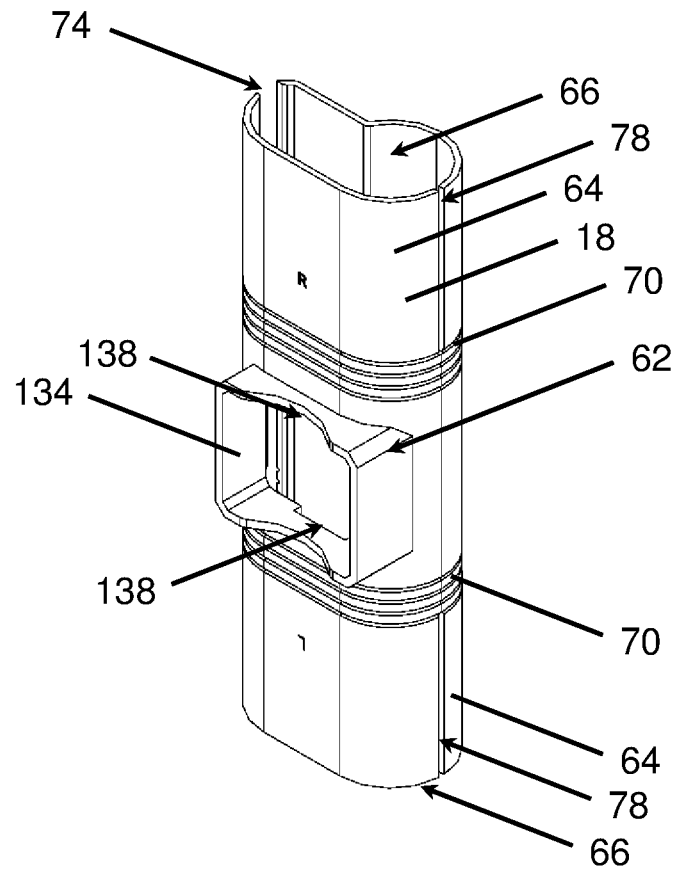
FIG. 5 is a drawing which shows an isometric view of the saw blade hood.

FIG. 5 shows the saw blade hood 18. The central opening 62 is defined by a peripheral wall 134 which is sized and shaped so that the opening 62 fits closely over the mounting flange 122 on the shroud body 14. The outward face of the peripheral wall 134 contacts the shroud body wall 126 when installed. The hood peripheral wall 134 may be formed with recesses 138 which receive the retaining tabs 130 and keep the saw blade hood 18 attached to the shroud body 14. When installed, the opening 62 extends the pneumatic conduit through the shroud body 14 and also extends the dust collection chamber.

The upper and lower portions 64 of the saw blade hood 18 define an open channel 66 which receives a portion of the saw blade 106. The blade channel 66 extends both upwardly and downwardly from the opening 62 and extends vertically through the hood 18. The saw blade hood 18 defines an internal pneumatic conduit which is "T" shaped when accounting for the opening 62 and the blade channel 66. The lower end of the blade channel 66 is largely blocked off by the material being cut by the saw 82 and the upper end of the blade channel 66 is nested inside of the upper blade guard 98. The outer side of the hood ends 64 (the side opposite the inlet opening 62) has a rounded wall extending vertically across that face coupled with a flat wall in order to better interface with the circular saw upper blade guard 98. The compression slots 78 also help the upwardly extending end 64 of the hood 18 to conform to the saw blade guard 98.

FIG. 5 better illustrates the molded in cut lines 70 which are provided to assist a user in cutting off the excess portion of the downwardly extending end 64 of the saw blade hood 18. Several different parallel cut lines 70 are provided on both ends 64 of the blade hood 18. These are generally perpendicular to the saw blade hood 18 so that they are parallel to the base 86 of the circular saw 82.

The saw blade channel 66 extends vertically through the hood 18 and is open to the rear side of the saw blade hood 18 via a blade slot 74. The blade slot 74 is sized to closely fit a saw blade (e.g. approximately 0.25 inches wide) and allow the saw blade 106 to extend into the blade channel 66. If a saw blade 106 is slightly misaligned with the blade slot 74, it will cut and enlarge the blade slot 74 during use of the saw 82.

When the saw blade hood 18 is attached to the shroud body 14, the ends 64 of the hood 18 are oriented along a vertical axis. The mounting flange 46 is oriented generally along a horizontal axis which is parallel to the saw blade 106 (when the shroud 10 is installed). The vacuum port is oriented generally vertically and somewhat away from the saw blade 106.

Figure 6:
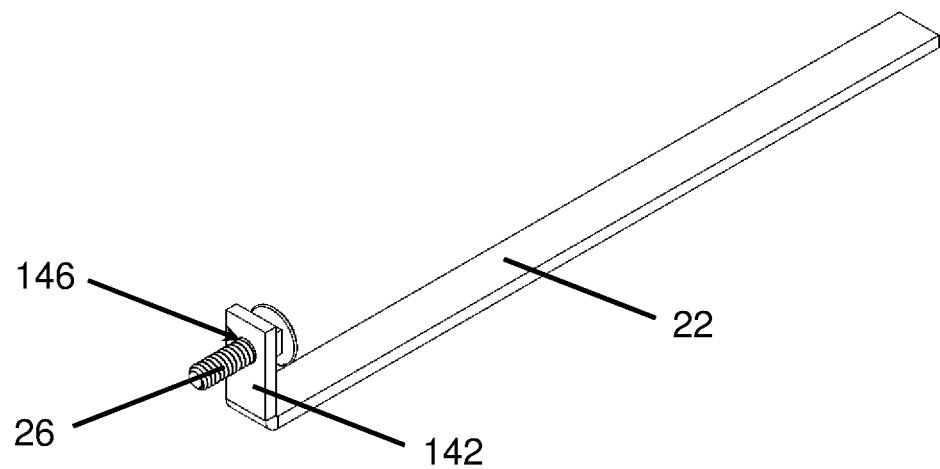
FIG. 6 is a drawing which shows an isometric view of the mounting bar and bolt.

FIG. 6 shows the mounting bar 22 and mounting bolt 26. The mounting bar 22 has a width and thickness which are compatible with the mounting bosses 110 on the saw base plate 86. The flat, horizontal part of the mounting bar 22 is sufficiently long to extend through the mounting bosses 110 and also provide for lateral adjustment of the position of the dust collection shroud 10 relative to the circular saw 82. The end 142 of the mounting bar 22 which is attached to the shroud body 14 is upturned at a 90 degree angle and has a hole 146 formed therethrough. The hole is sized to receive the mounting bolt 26. The use of a carriage bolt 26 and thumb nut 30 (FIG. 1) eliminates the need for tools in securing the mounting bar 22 to the shroud body 14.

Figure 7:
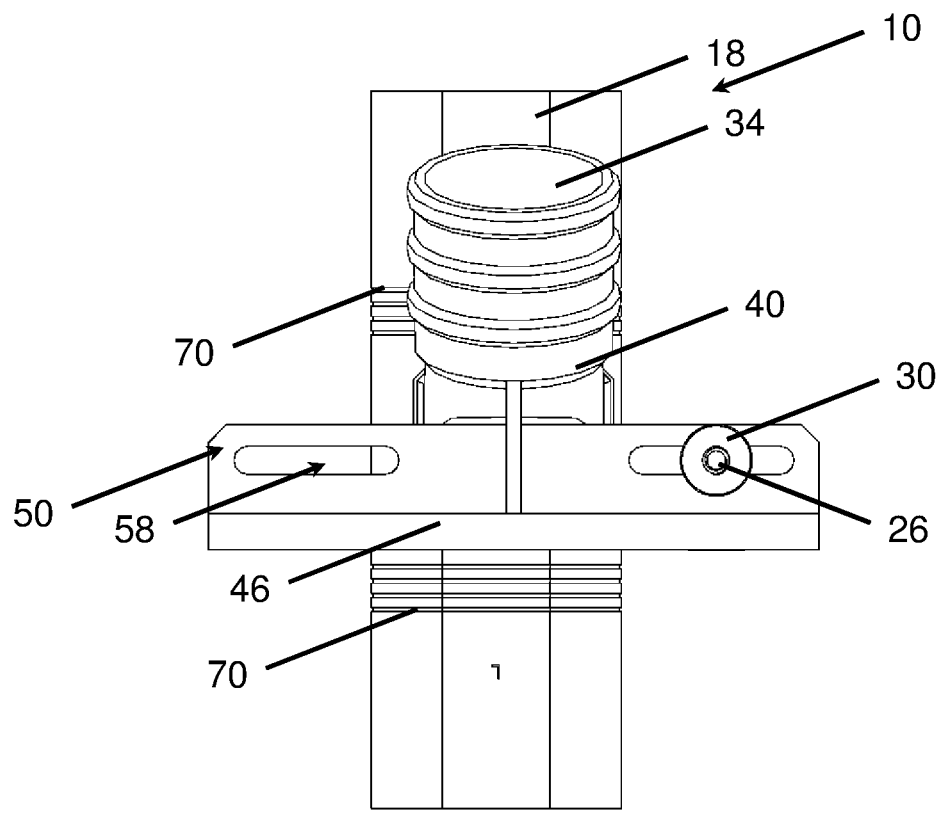
FIG. 7 is a drawing which shows a side view of the dust shroud.
Figure 8:
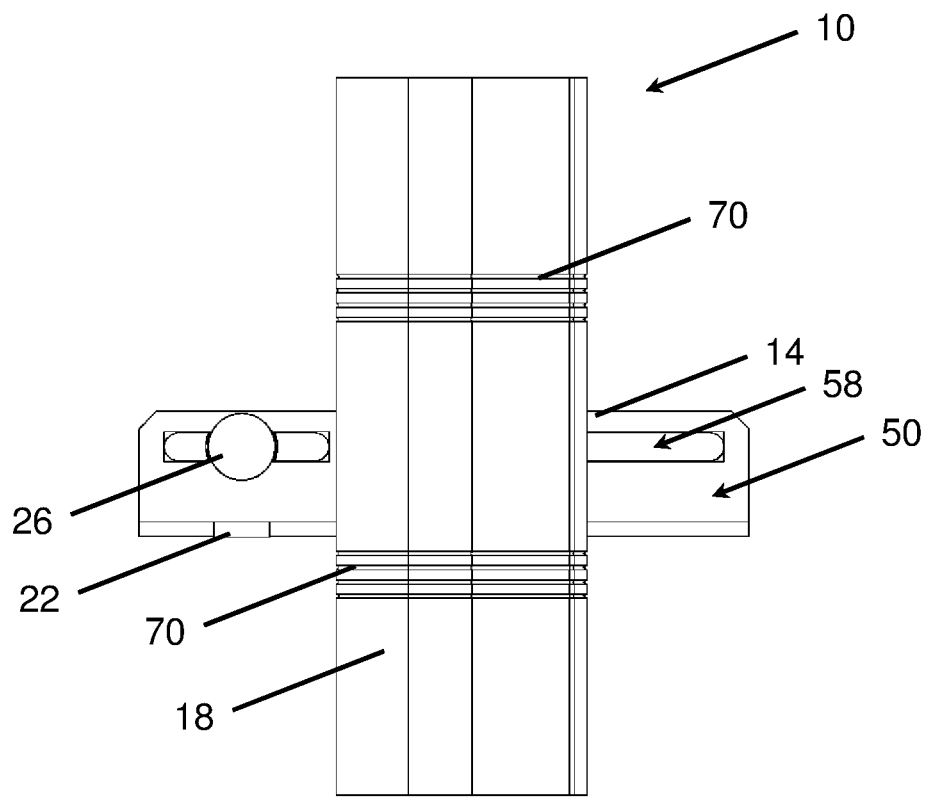
FIG. 8 is a drawing which shows a side view of the dust shroud.

FIG. 7 shows a side view of the dust collection shroud 10 as it would be seen looking towards the outboard side of the saw blade 106. The vacuum port 34 is neither leaning forwards or backwards relative to the circular saw 82. This provides for a position which is equally suited for mounting to a left or a right handed circular saw 82. FIG. 8 shows a side view of the dust collection shroud 10 as it would be seen looking towards the inboard side of the saw blade 106.

Figure 9:
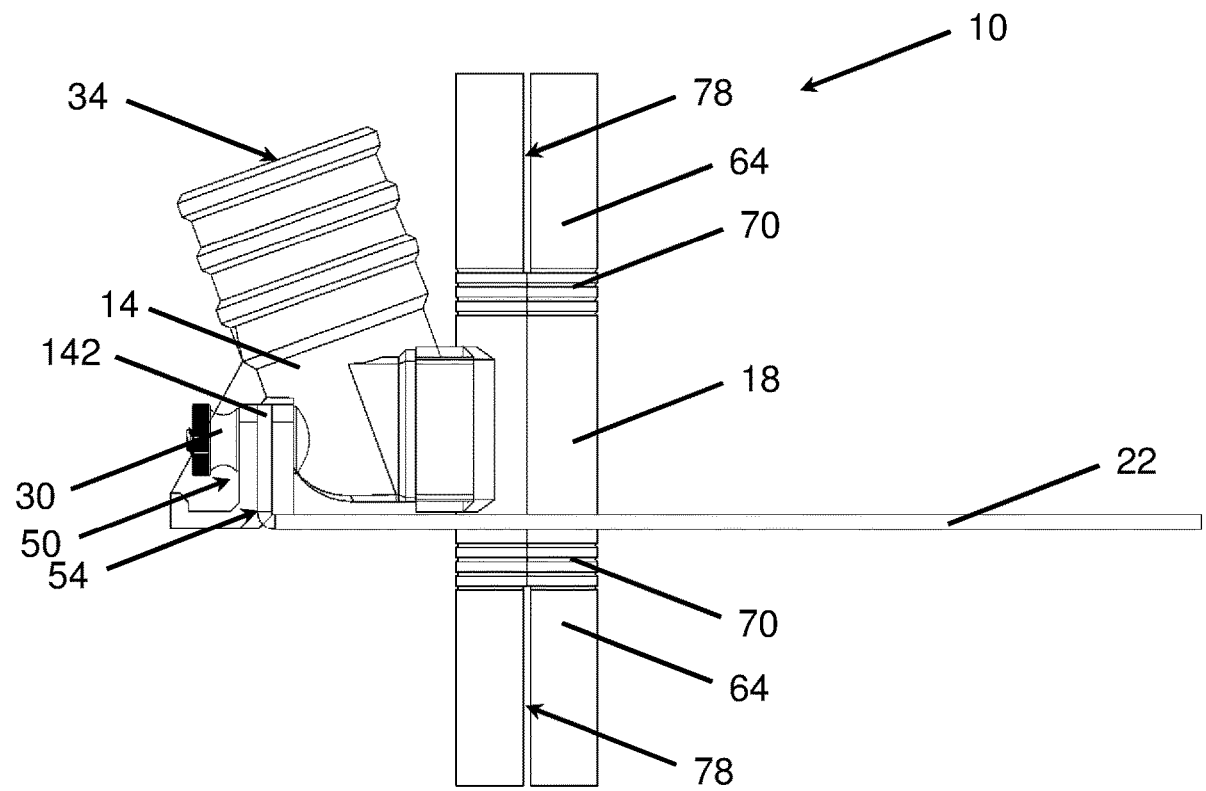
FIG. 9 is a drawing which shows a front view of the dust shroud.

FIG. 9 shows a front view of the dust collection shroud 10. FIG. 9 illustrates how the vacuum port 34 is angled away from the saw blade hood 18 and the saw blade 106. This positions the vacuum hose in a position where it does not interfere with the use of the circular saw 82. FIG. 9 also illustrates how the upturned end 142 of the mounting bar fits snugly into the slot 54 in the mounting portion 50 of the shroud body 14. The mounting bolt 26 and thumb nut 30 compress the mounting flange 46 against the mounting bar end 142. The compression slots 78 are also visible. The compression slots 78 are formed in the front side of the upper and lower portions 64 of the hood 18. The lower compression slot 78 is typically removed when the bottom of the saw blade hood 18 is trimmed to fit the circular saw 82. The upper compression slot 78 allows the width of the upper end 64 of the saw blade hood 18 to compress and fit snugly into the upper blade guard 98.

Figure 10:
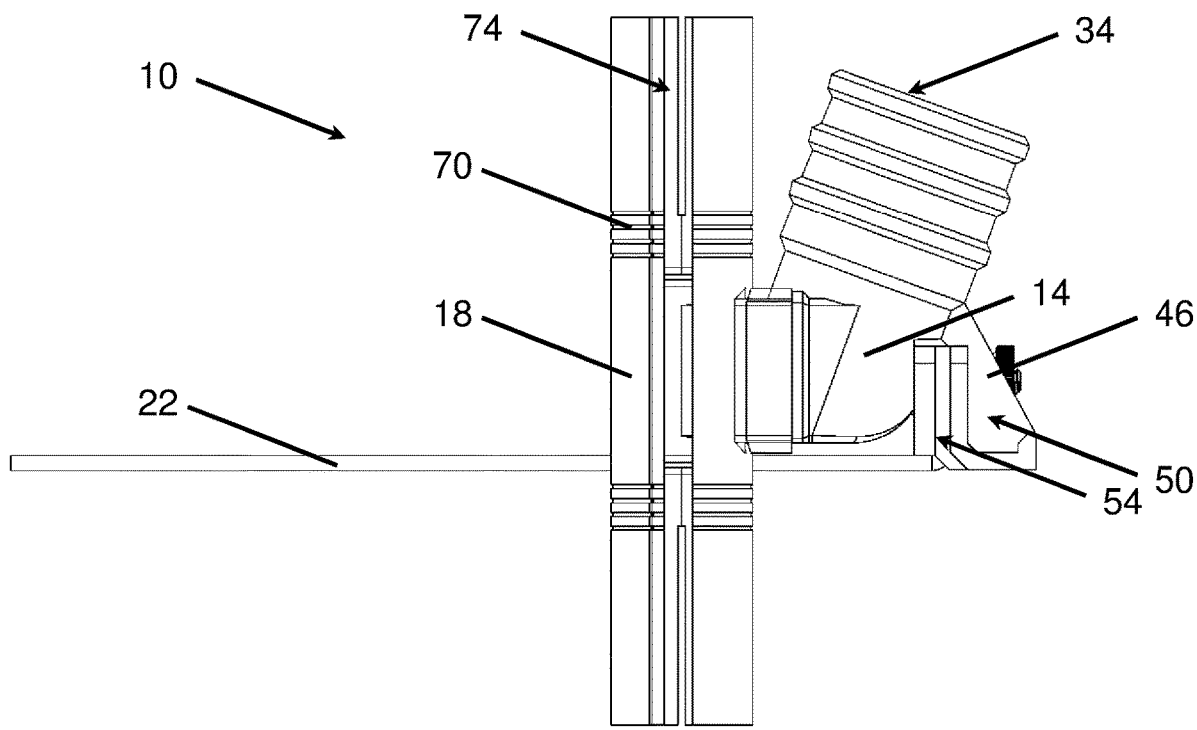
FIG. 10 is a drawing which shows a rear view of the dust shroud.

FIG. 10 shows a back view of the dust collection shroud 10. FIG. 10 shows the blade slot 74. The blade slot 74 is usually between about 0.1 inches wide and about 0.5 inches wide, and it is typically about 0.25 inches wide. The blade slot 74 extends vertically along the entire height of the front of the saw blade hood 18.

Figure 11:
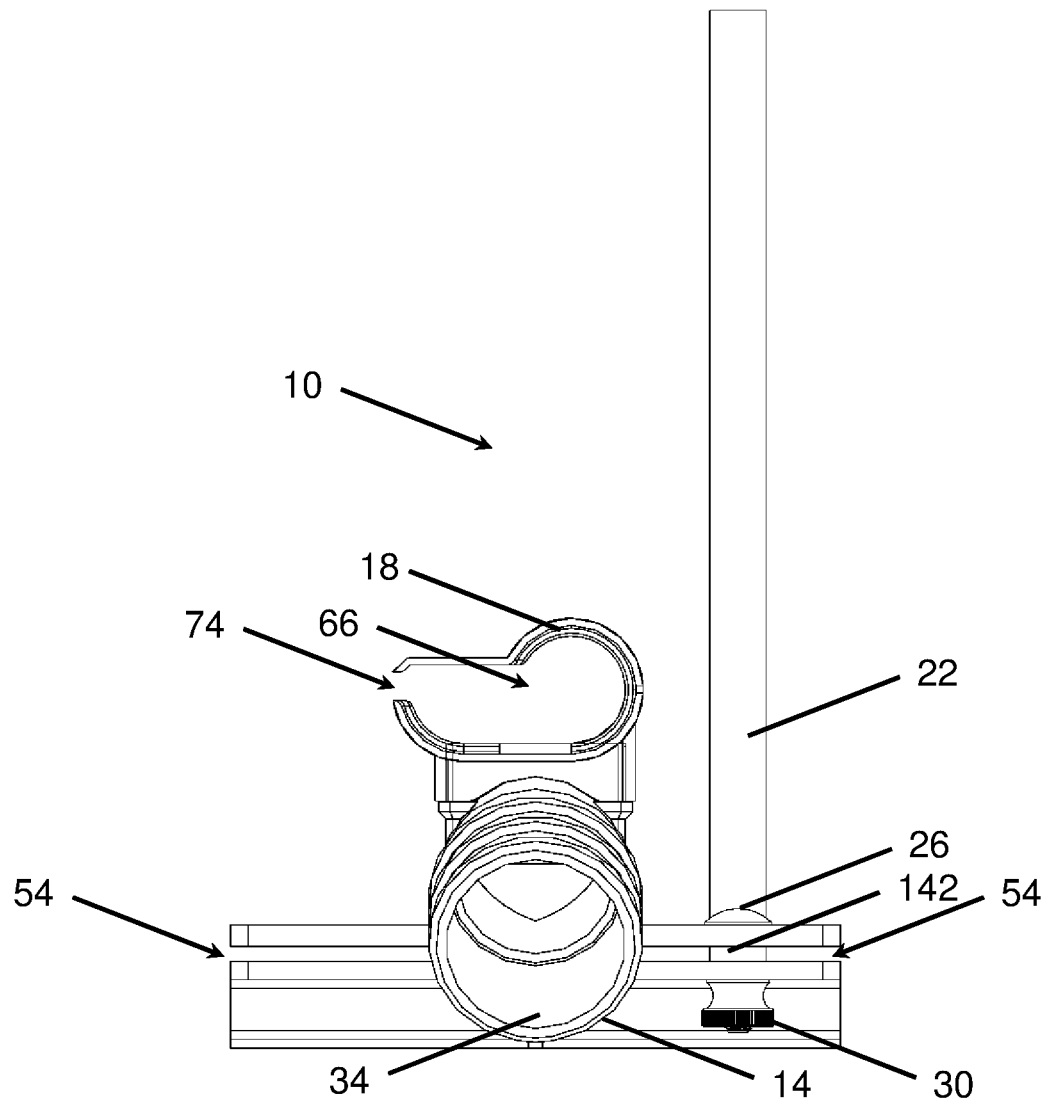
FIG. 11 is a drawing which shows a top view of the dust shroud.
Figure 12:
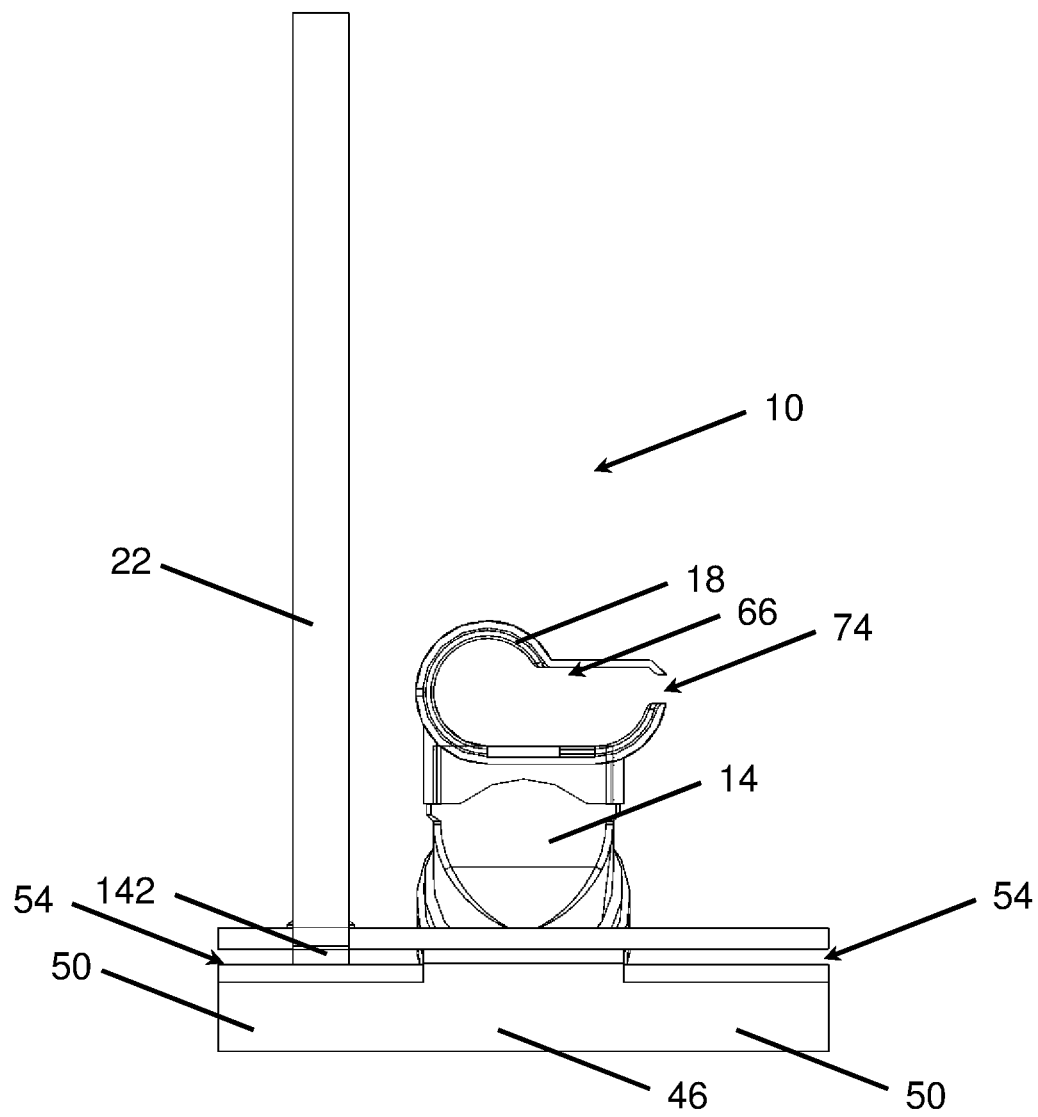
FIG. 12 is a drawing which shows a bottom view of the dust shroud.

FIG. 11 shows a top view of the dust collection shroud 10. FIG. 12 shows a bottom view of the dust collection shroud 10. The saw blade channel 66 extends vertically through the saw blade hood 18 and allows dust to move from any location in the hood 18 towards the opening 62 and out of the vacuum port 34. The bottom of the saw blade channel 66 (after trimming the lower portion 64 of the hood 18) is disposed adjacent the saw base plate 86 and is mostly closed by the material being cut by the saw 82. The upper portion 64 of the saw blade channel 66 is disposed in the upper blade guard 98. Much of the dust created by the blade 106 is ejected from the blade teeth inside of the bottom of the blade channel 66 and is carried out of the vacuum port 34 by the airflow generated by a vacuum. In using the circular saw 82 and the dust collection shroud 10, the vacuum hose would typically be inserted into the vacuum port 34 and would extend upwardly and curve backwards as indicated generally at 150 in FIG. 2.

Figure 13:
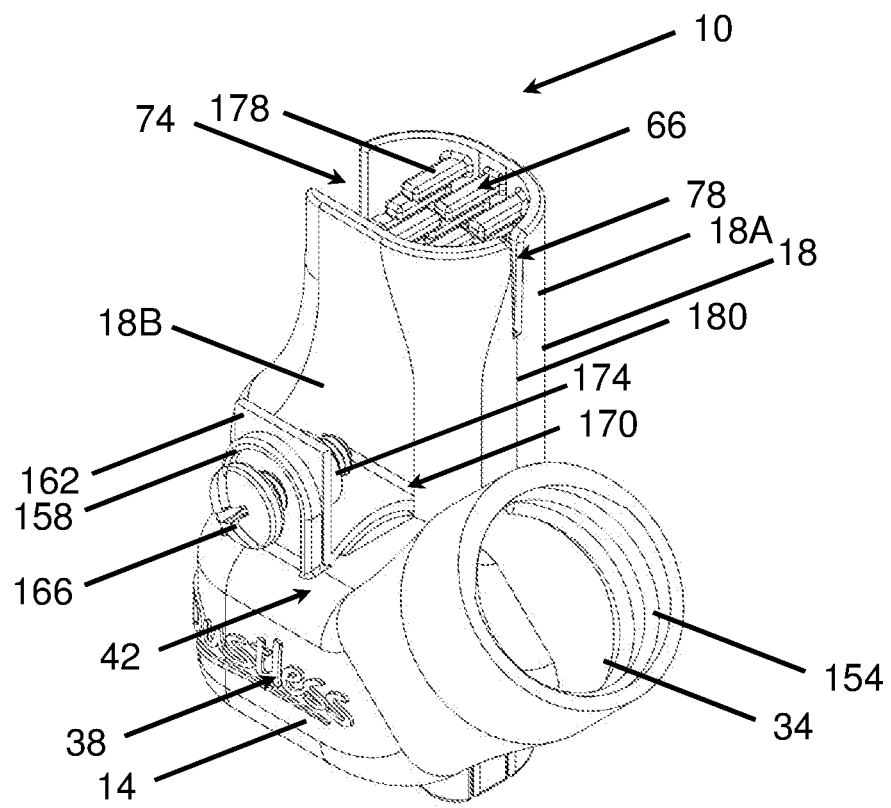
FIG. 13 is a drawing which shows a perspective view of the dust shroud.

Referring now to FIG. 13, an isometric drawing of another embodiment of the dust collection shroud 10 is shown. The shroud 10 includes a shroud body 14, a saw blade hood 18, and a vacuum port 34. The vacuum port 34 is pneumatically connected to the saw blade hood 18 via a dust collection chamber/passage 38 which extends through the shroud body 14. The vacuum port 34 extends forwards and upwards from the shroud body 14. The vacuum port 34 provides an opening which receives a standard 1.25 or 1.5 inch vacuum hose to thereby connect the dust collection shroud 10 to a vacuum such as a shop canister vacuum. The example vacuum port 34 includes an internal thread or ridges 154 which engage the exterior of the vacuum hose. Many vacuum hoses are formed with a ribbed exterior to prevent collapse and may have a helical rib which threads into threads/ribs 154 in the vacuum port to retain the vacuum hose in the vacuum port 34. The bore of the vacuum port 34 is pneumatically connected to a dust collection passage 38 which is formed by the shroud body 14 and passes through the shroud body 14. The dust collection passage 38 receives dust from the circular saw and transmits the dust through the vacuum port 34 to be collected by a vacuum. The dust collection passage 38 includes an opening, indicated at 42, which interfaces with the saw blade hood 18. The saw blade hood 18 is attached to the shroud body 14 and is typically formed as a single piece with the shroud body 14. The saw blade hood 18 defines a vertical channel which extends around the circular saw blade when the dust collection shroud 10 is in use.

The shroud body 14 also includes a mounting flange 158 which extends generally vertically from the shroud body 14 and is used to attach the dust shroud 10 to a circular saw. Typically, the shroud body, including the saw blade hood 18, vacuum port 34, and mounting flange 158, is made from plastic. A metal mounting bracket 162 and a screw 166 are used in combination with the mounting flange 158 to attach the dust collection shroud 10 to the circular saw. The metal mounting bracket 162 is generally "U" shaped and extends through a slot 170 in the saw blade hood 18. The metal mounting bracket 162 includes a first vertical leg which extends parallel to the mounting flange 158 and contacts the mounting flange 158. The first vertical leg is attached to a generally horizontal portion of the metal mounting bracket 162 which extends to the saw blade hood and passes through the slot 170. The generally horizontal portion of the metal mounting bracket 162 may be curved (such as arching upwardly as shown) if needed to accommodate a desired shape of the shroud body 14. A curved horizontal portion of the mounting bracket 162 may also provide some horizontal spring and flexibility and may help provide a secure connection between the shroud 10 and the stationary blade guard 98. A second vertical leg is attached to the generally horizontal portion of the metal mounting bracket 162 and extends upwardly inside of the saw blade hood 18 against the wall of the saw blade hood 18. The first vertical leg and the second vertical leg of the metal mounting bracket are generally parallel to each other and extend upwardly from the horizontal portion of the metal mounting bracket. The metal mounting bracket 162 includes a threaded boss 174 which provides additional threads and strength for the screw 166. The threaded boss 174 is attached to or part of the first vertical leg and the screw 166 passes through the mounting flange 158 and the metal mounting bracket 162.

The mounting flange 158, metal mounting bracket 162, and screw 166 are used to attach the dust collection shroud 10 to a circular saw via the blade guard of the circular saw. The screw 166 presses the outer side of the dust collection shroud 10 against the adjacent wall of the upper blade guard 98 to thereby secure the dust collection shroud 10 to the circular saw.

The upwardly extending end of the saw blade hood 18 will extend upwardly into the blade guard of a circular saw. The downwardly extending end of the saw blade hood 18 will extend downwardly towards the bottom of the saw base plate. The saw blade hood 18 is oriented vertically in the plane of the saw blade and the saw blade extends into a saw blade channel 66 formed through the center of the saw blade hood 18. The saw blade channel 66 extends vertically through the saw blade hood 18. The saw blade hood 18 includes a blade slot 74 that extends through the saw blade hood 18 vertically along the rear of the saw blade hood 18. The blade slot 74 is generally aligned with the middle of the saw blade channel 66. When the shroud 10 is installed onto a circular saw, the saw blade extends through the saw blade slot 74 and the saw blade teeth at the front of the saw blade are disposed in the saw blade channel 66.

The saw blade hood 18 includes a plurality of inner fingers 178 which extend inward from the inner side of the saw blade hood and outer fingers 178 which extend inwardly from the outer side of the saw blade hood 18. The example fingers 178 are oriented generally perpendicular to the plane of a saw blade and extend inwardly towards the center of the saw blade channel 66. The fingers may also be disposed at an angle to the plane of the saw blade 106. The fingers 178 stop short of the center of the blade channel 66 and create a planar gap between ends of the fingers 178 which is generally aligned with the saw blade slot 74. Once the shroud 10 is installed onto a circular saw, the saw blade passes between the ends of the fingers 178 and the fingers 178 extend towards the saw blade on both sides of the saw blade. The fingers 178 are typically distributed across the entire interior of the saw blade channel 66. The example fingers 178 are approximately 0.2 inches wide and approximately 0.1 inches thick and sufficiently long to extend to a position adjacent the saw blade. The fingers 178 are distributed across the interior of the saw blade channel 66 so that there is a gap between rows and columns of fingers which is approximately equal to the width of the fingers. That is to say that there is a gap of approximately 0.2 inches horizontally between adjacent fingers and a similar gap vertically between adjacent fingers. Rows of fingers 178 are typically offset so that a finger 178 is positioned in vertical alignment with the gap between fingers in the rows of fingers above and below that finger.

The fingers 178 block high velocity cutting debris and stop the debris so that it can be entrained into the airflow and be captured by the vacuum. as the circular saw cuts through material, the debris created from the cut is carried by the teeth of the saw blade at a high velocity and is thrown from the teeth. As the debris exits the gullets between the blade teeth, debris strikes the fingers 178; losing a significant amount of energy and speed. The lower velocity debris is then more easily entrained into the vacuum created airflow through the dust shroud 10 and is collected by the vacuum. The fingers 178 thus increase the collection efficiency of the shroud 10.

The upper and lower ends of the saw blade hood 18 are formed with a compression/flexibility slot 78 along the front side (away from the blade) of the saw blade hood 18. This compression slot 78 helps the upwardly extending end 64 of the hood 18 to conform to the saw blade guard. The circular saw dust shroud 10 is typically molded from a mildly flexible material which is still relatively rigid to provide necessary strength allow conformation to the saw blade guard. The saw blade hood 18 may contact the inside of the saw blade guard once it is installed and the slots 78 allow the saw blade hood to bend slightly and adjust to the particular saw blade guard.

The saw blade hood 18 may include a hinge 180 which allows the inside half/section 18A of the saw blade hood to pivot away from the outside half/section 18B of the saw blade hood. The hinge 180 may be useful in allowing easier manufacturing of the shroud 10, such as by injection molding. The hinge 180 may also simplify installation of the shroud 10 in some circular saws 82. The dust collection shroud 10 may also be manufactured via additive manufacturing and a hinge 180 may not be necessary in such a situation.

Figure 14:
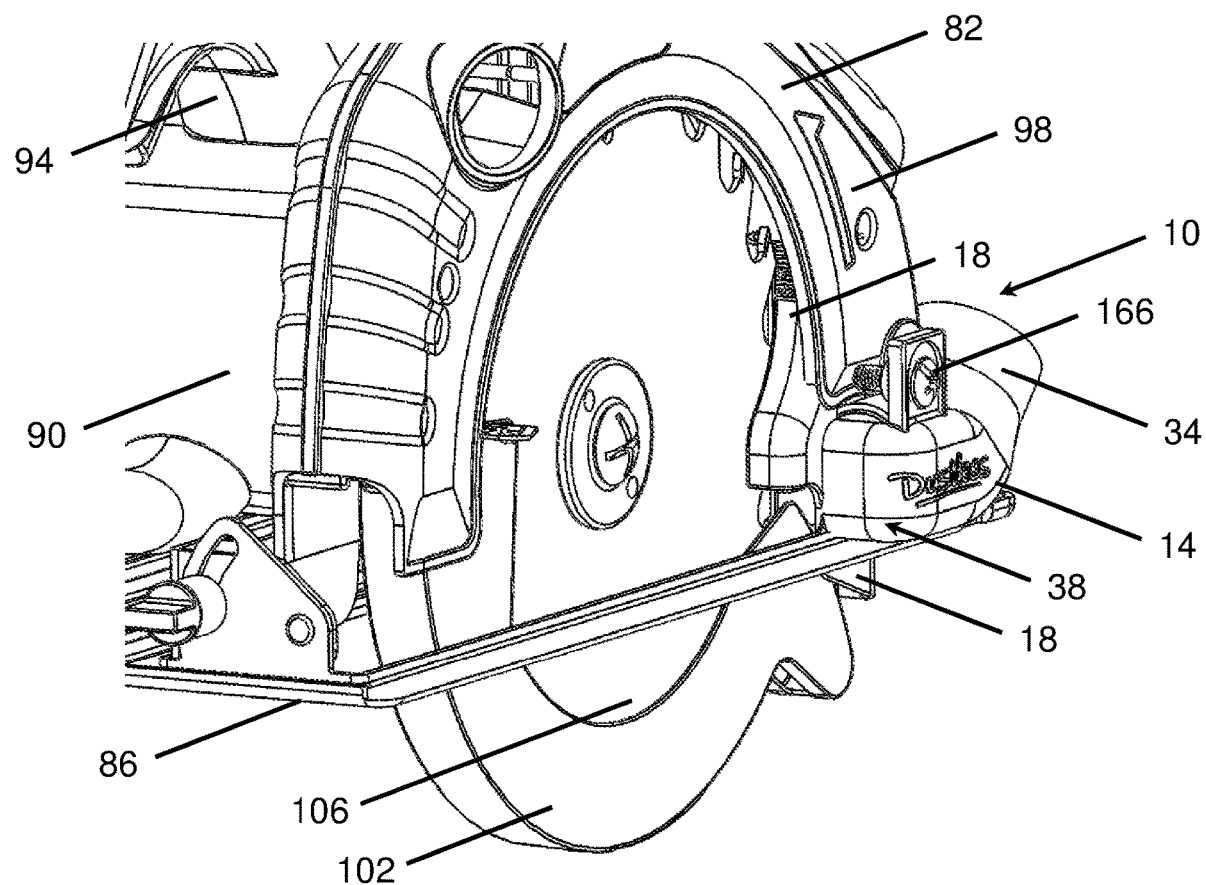
FIG. 14 is a drawing which shows a perspective view of the dust shroud attached to a circular saw.

FIG. 14 shows a perspective drawing of the dust collection shroud 10 attached to a circular saw 82. The circular saw 82 includes a base plate 86 which contacts a material being cut by the saw. The saw 82 also includes a motor 90, hand grip 94, upper blade guard 98, lower movable blade guard 102, and blade 106. Other parts of the circular saw 82 which do not directly interface with the dust collection shroud 10 are not individually numbered. The dust collection shroud 10 has been attached to the upper blade guard 98. The screw 166 has been advanced towards the upper blade guard 98 so that the upper blade guard 98 is held between the saw blade hood 18 and the screw 166. The far side of the saw blade hood is disposed on the far side of the saw blade 106 and the near side of the saw blade hood 18 is disposed on the near side of the saw blade 106; with the blade 106 passing into the channel 66 in the saw blade hood 18. The bottom of the dust collection passage 38 is positioned adjacent the saw base plate 86. The vacuum port 34 is positioned adjacent the front of the circular saw 82 and is angled forwards and upwards.

As shown, the saw blade hood 18 extends downwardly past the base plate 86 of the circular saw 82. If the dust collection shroud 10 is made of a sufficiently flexible material, the lower end of the saw blade hood will bend rearwardly into a blade slot on the saw base plate when the circular saw is moved forwards across a workpiece which is being cut. If the dust collection shroud 10 is made of a more rigid material, the lower end of the saw blade hood 18 may be cut with a hand saw or utility knife to remove the portion of the hood 18 which extends downwardly past the saw base plate 86.

When the dust collection shroud 10 is installed on a circular saw 82 as shown in FIG. 14, the dust collection passage 38 is extends from the front of the blade to a position adjacent the side of the base plate 86 and to a position adjacent the front of the saw base plate 86. This positions the dust collection chamber adjacent the point where dust is generated while cutting. The saw blade hood 18 extends around the front of the saw blade 106 and is positioned close to the front of the upper blade guard 98. The dust collection shroud 10 both collects a majority of dust near the point of dust generation and keeps dust contained within the saw upper blade guard 98; reducing the amount of dust which is spread into the environment during use of the circular saw 82.

Figure 15:
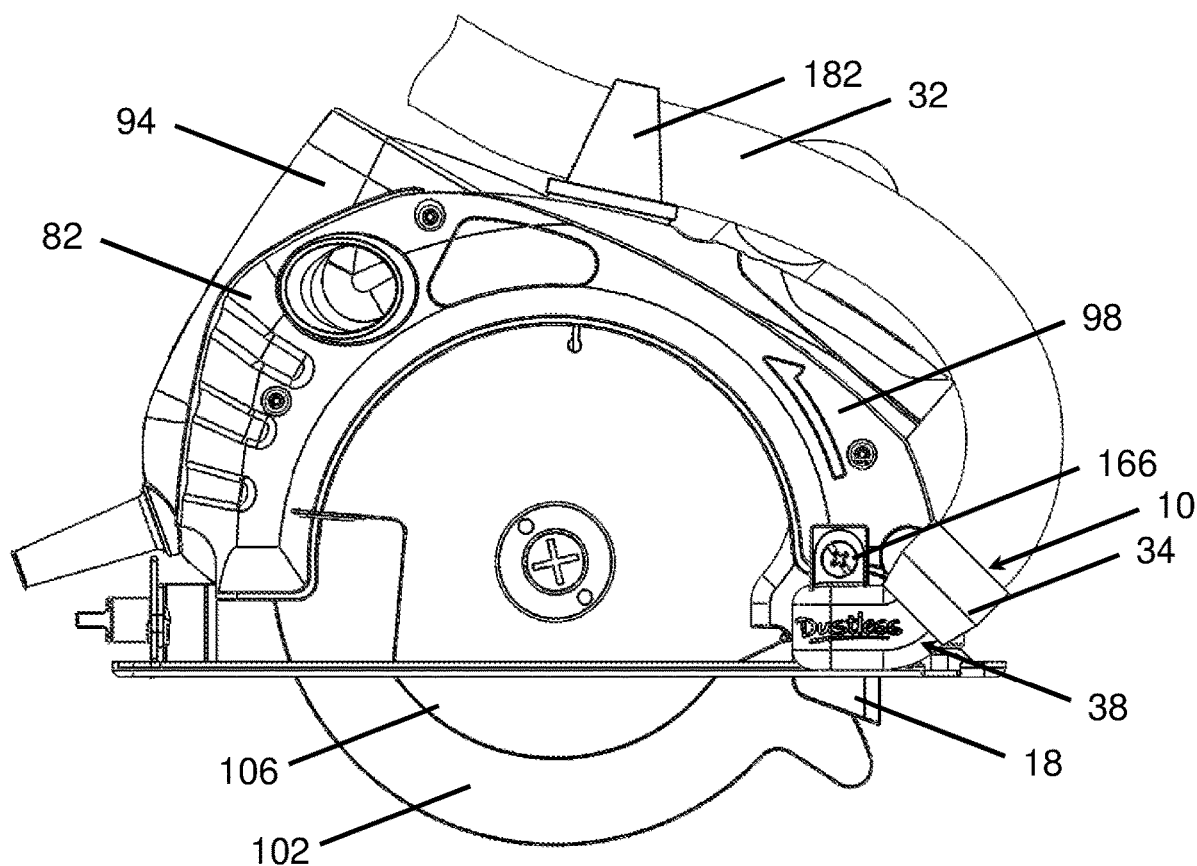
FIG. 15 is a drawing which shows a side view of the dust shroud attached to the circular saw.

FIG. 15 shows a side view of the dust collection shroud 10 and the circular saw 82. It can be seen how the dust collection shroud 10 is compact and does not extend significantly beyond the original size of the circular saw 82. It can also be seen how the dust collection shroud 10 may be used with a hose anchor 182. The hose anchor includes a base which is attached to the circular saw 82 with a hook and loop cinch strap, a zip tie, double sided tape, or adhesive and an upper hose loop which receives a vacuum hose 32. The vacuum hose 32 is passed through the hose anchor 182 and is attached to the dust collection shroud 10.

In operation, a vacuum (such as a canister vacuum, not shown) is used to draw air through the shroud 10 to collect dust and debris. Air flows from an area around the front of the saw blade 106, into the saw blade hood 18, through an opening 42 between the saw blade hood 18 and the dust collection passage 38, through the dust collection passage, through the bore of the vacuum port 34, through a vacuum hose 32, and into the vacuum or dust collector.

Figure 16:
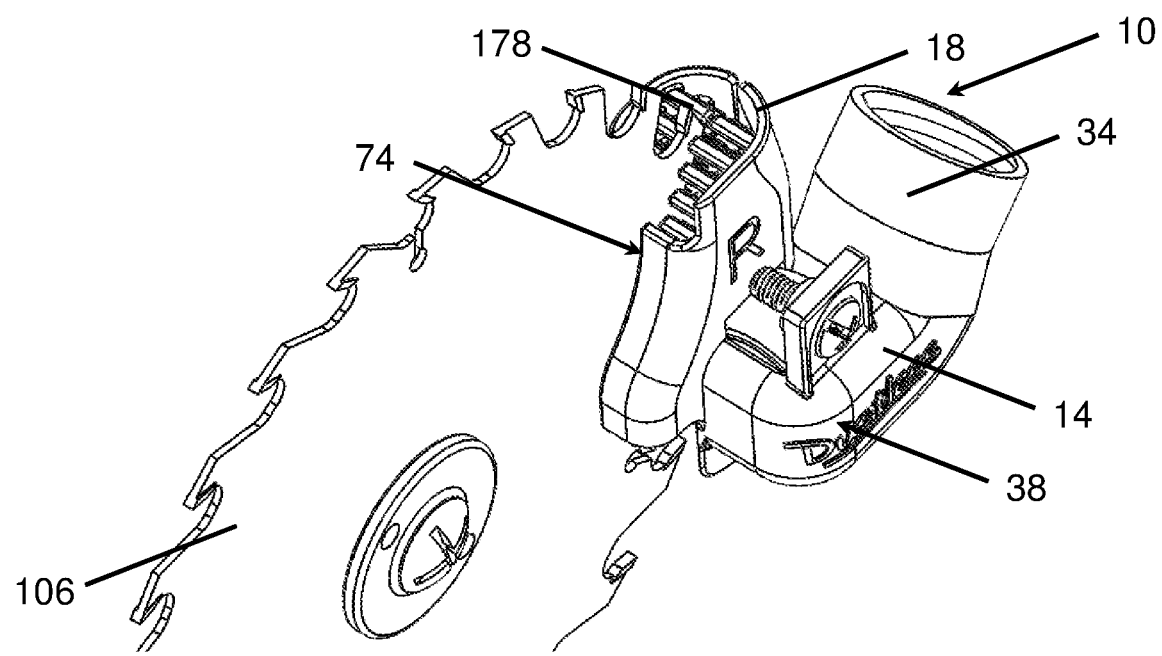
FIG. 16 is a drawing which shows a perspective view of the dust shroud and the circular saw blade.

FIG. 16 shows a drawing of the dust collection shroud 10 and the saw blade 106 and illustrates the position of the dust collection shroud 10 relative to the saw blade 106. This drawing better illustrates how the finger 178 extend inwardly from left and right sides of the saw blade hood 18 and terminate adjacent left and right faces of the saw blade 106. The saw blade 106 passes through the blade slot 74 and between the fingers 178. The saw blade teeth are positioned towards the front of the saw blade channel 66 but is spaced away from the front of the saw blade hood 18.

Figure 17:
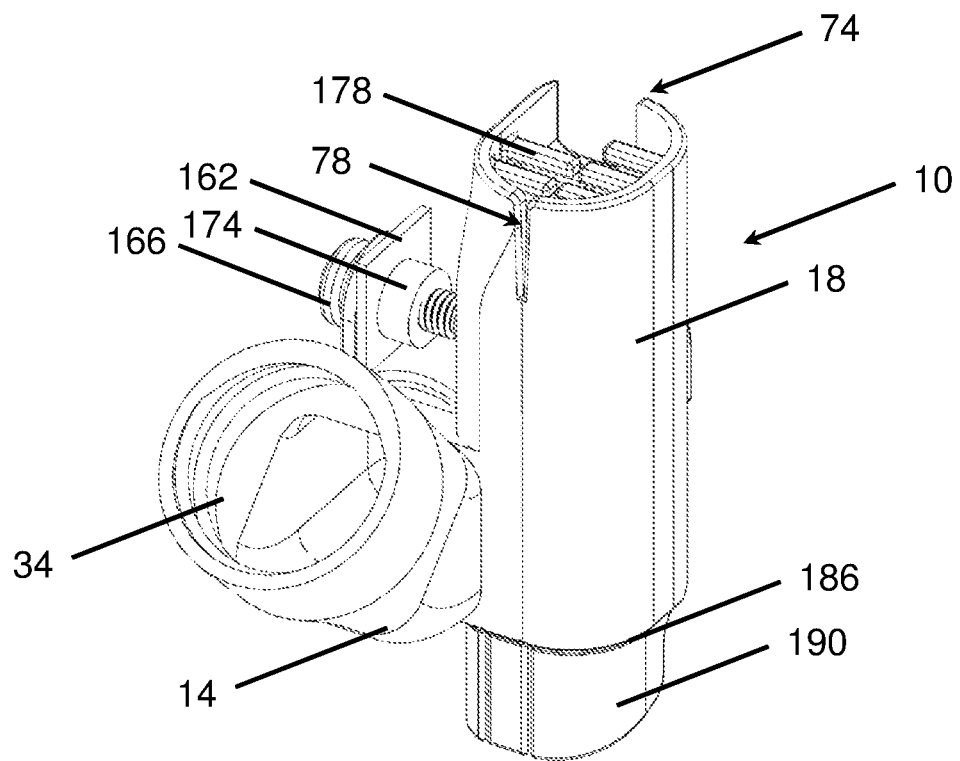
FIG. 17 is a drawing which shows a perspective view of the dust shroud.

FIG. 17 shows another perspective view of the front of the dust collection shroud 10. This drawing shows the right side of the shroud 10 as viewed from the front. The bottom of the saw blade hood 18 includes a shoulder 186 and a lower section 190 of reduced size and thickness. For many circular saws, the lower section 190 fits through the blade slot in the circular saw base plate 86. For some saw, the shoulder 186 rests against the base plate. The upper portion of the saw blade hood 18 and the lower shoulder 186 are held between the fixed upper blade guard 98 and the base plate 86 and help to stabilize the shroud 10. The thinner lower section 190 of the saw blade hood 18 allows flexibility as discussed above when the dust collection shroud 10 is made from a more flexible material. If the dust collection shroud 10 is made from a more rigid material, a user may more easily trim the bottom of the saw blade hood 18 to length.

Figure 18:
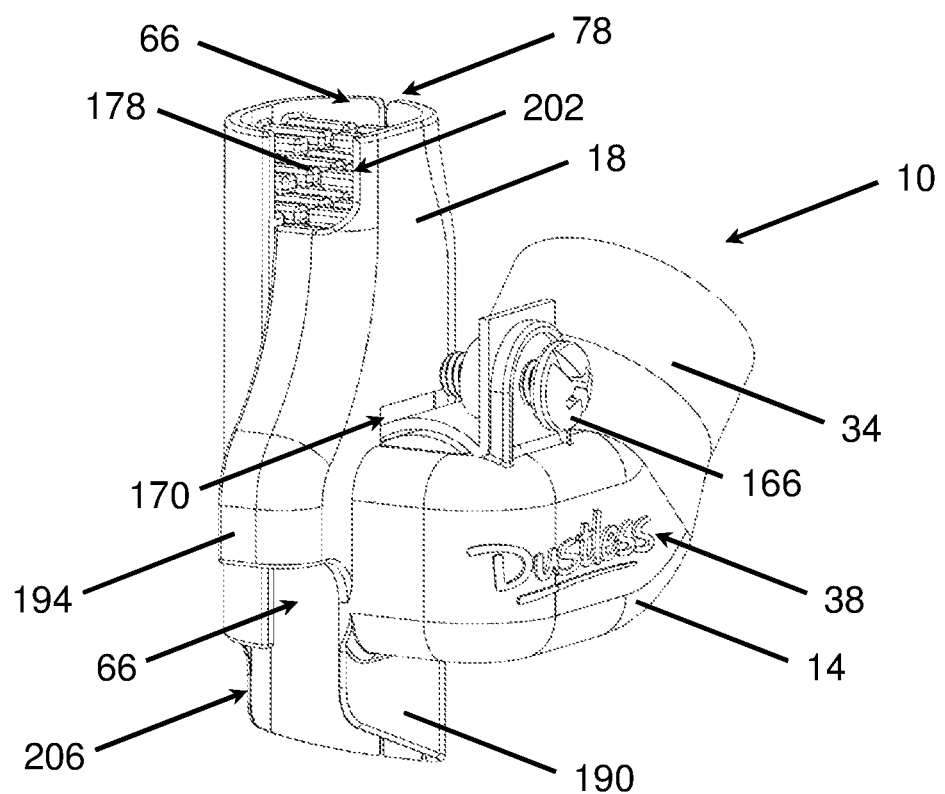
FIG. 18 is a drawing which shows a perspective view of the dust shroud.

FIG. 18 shows a perspective view of the dust collection shroud 10 from the rear left of the shroud 10. The back of the inside side of the saw blade hood 18 (which is positioned on the inside of the saw blade 106) is straight from top to bottom. The back of the outside side of the saw blade hood 18 (which is positioned on the outside of the saw blade 106) includes a rearward bulge 194 which extends rearwardly and provides a wider lower inlet opening on the outside side of the saw blade hood 18.

Figure 19:
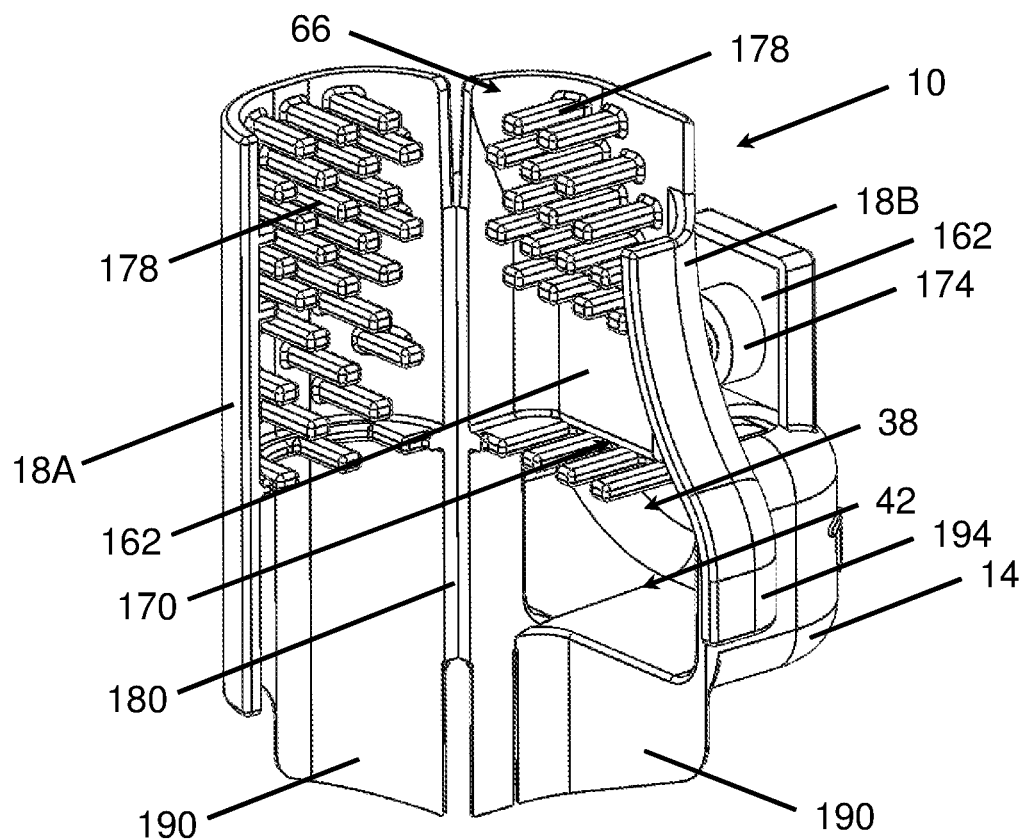
FIG. 19 is a drawing which shows a perspective view of the dust shroud.

FIG. 19 shows a rear perspective view of the dust collection shroud 10 with the inside half 18A of the saw blade hood 18 pivoted away from the outside half 18B of the saw blade hood 18 at the hinge 180. The internal features of the dust collection shroud 10 are more readily observed. The fingers 178 may be positioned in the interior of the saw blade channel 66 so that there is less space between the fingers 178 in an upper section of fingers 178 adjacent the top of the saw blade hood and so that there is more space between fingers 178 in a lower section of fingers 178 adjacent the opening 42 between the saw blade channel 66 and the dust collection passage 38. The upper section of fingers 178 are spaced apart from adjacent fingers a distance which is approximately equal to the width of the fingers 178. The lower section of fingers 178 are spaced apart a distance which is approximately equal to twice the width of the fingers 178.

Figure 20:
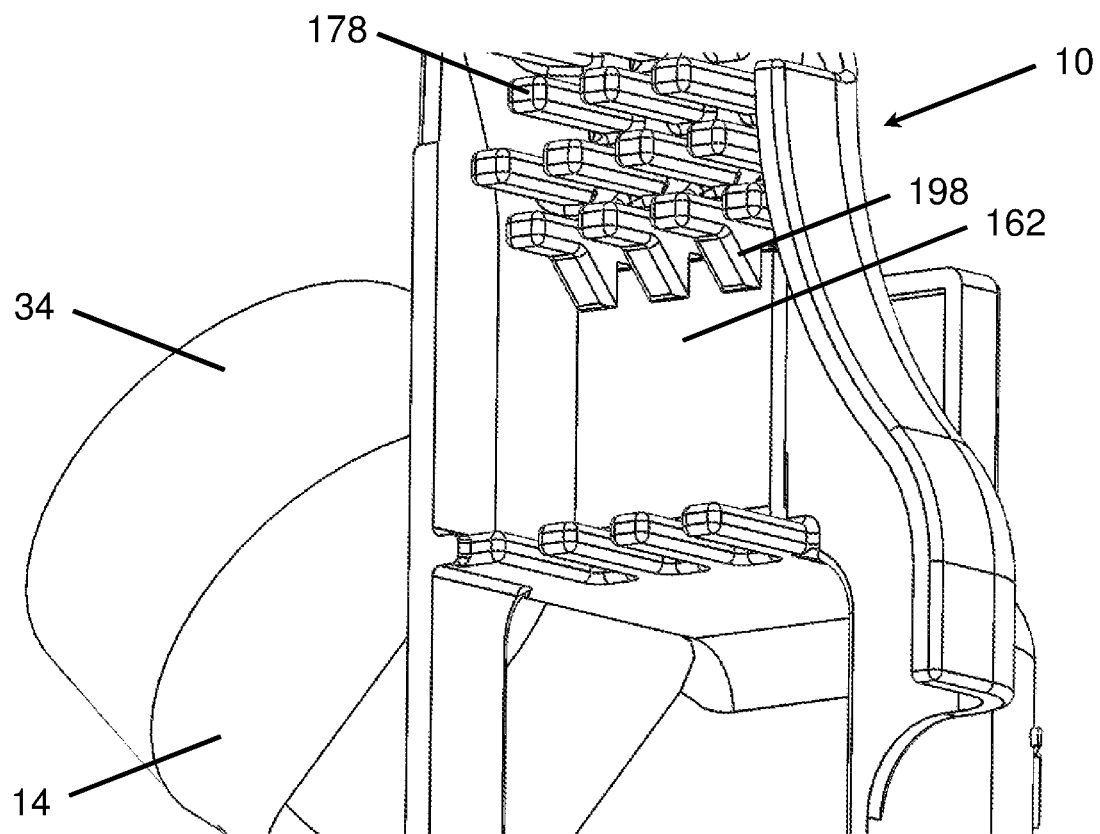
FIG. 20 is a drawing which shows a perspective view of the dust shroud.

The second vertical leg of the metal mounting bracket 162 is also visible inside of the outside half 18B of the saw blade hood 18. The second vertical leg of the metal mounting bracket 162 extends into the saw blade channel 66 via slot 170 and extends upwardly along the side wall of the saw blade hood 18. FIG. 20 shows a perspective view of a portion of the shroud 10 with the inner half 18A of the saw blade hood 18 not shown. FIG. 20 shows how the side wall of the saw blade hood 18 may be formed with retaining tabs 198 which engage the metal mounting bracket 162 to secure the mounting bracket 162 in position on the shroud 10. The mounting bracket 162 supports the saw blade hood 18 and allows the shroud 10 to be securely attached to a circular saw blade guard 98 by holding the blade guard 98 between the saw blade hood 18 and the screw 166.

Figure 21:
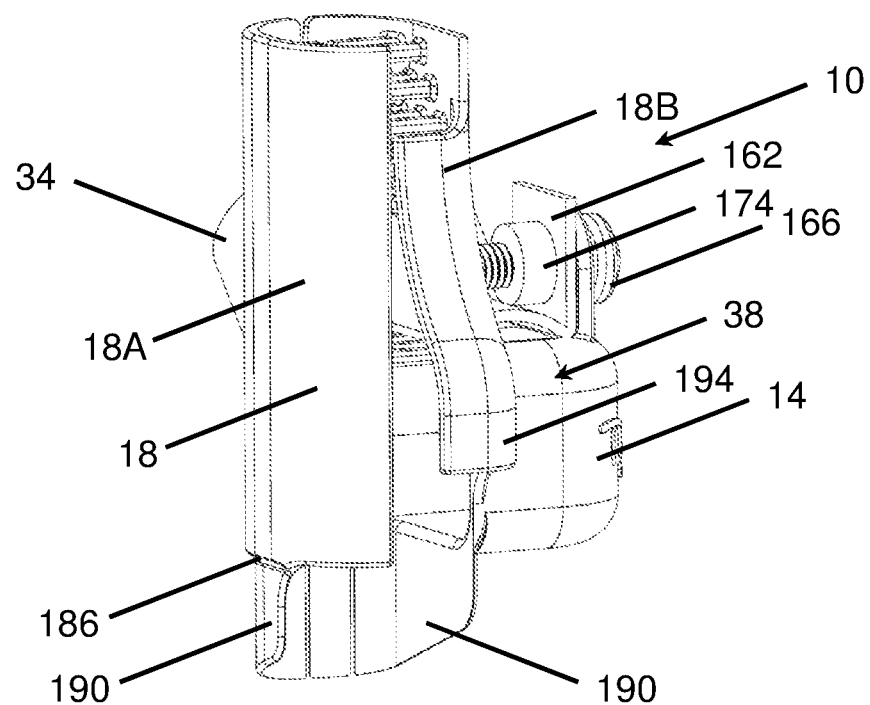
FIG. 21 is a drawing which shows a perspective view of the dust shroud.

FIG. 21 shows a rear perspective view of the dust collection shroud 10. It can be seen how the inside side 18A of the saw blade hood 18 is generally straight along its rear edge while the outside side 18B of the saw blade hood 18 includes a rearwardly extending bulge 194 which creates a larger lower opening.

Figure 22:
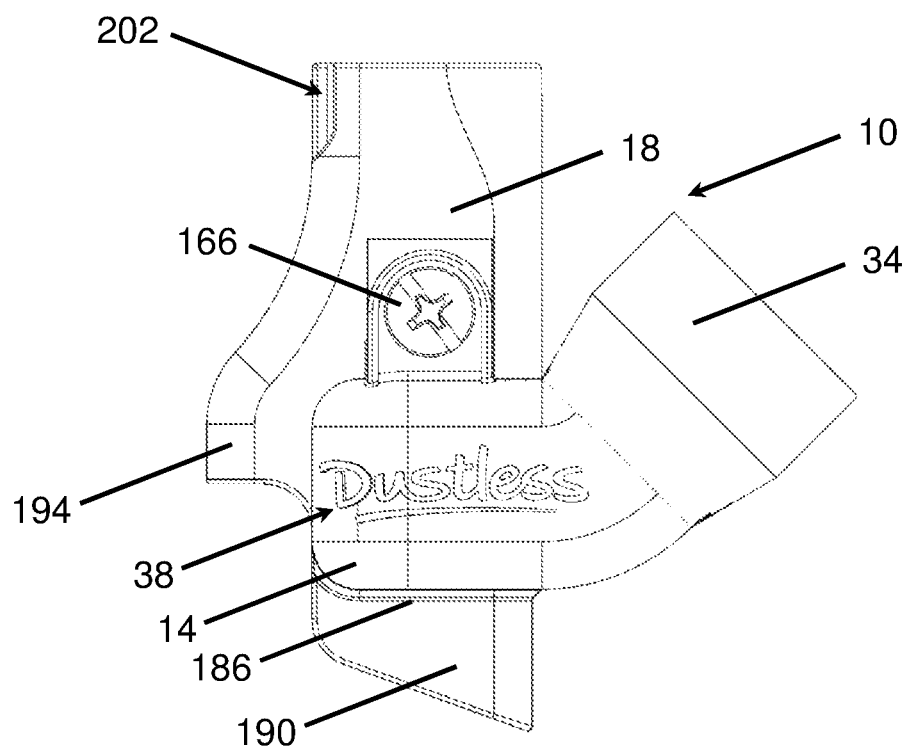
FIG. 22 is a drawing which shows a left side view of the dust shroud.

FIG. 22 shows a left side view of the dust collection shroud 10. It can be seen how the dust collection passage 38 extends forwards and upwards from a position near the bottom of the saw blade hood 18. The vacuum port 34 extends forwards and upwards at an angle of approximately 45 degrees relative to the base plate 86 of the circular saw 82. The rear edge of the outside side 18B of the saw blade hood 18 curves rearwardly to the bulge 194. The lower section 190 of the saw blade hood 18 is angled such that the front of the saw blade hood 18 is lower than the rear of the saw blade hood 18. The outside half 18B of the saw blade hood 18 may include an upper notch 202 which removes an upper rear portion of the outside half 18B of the saw blade hood 18.

Figure 23:
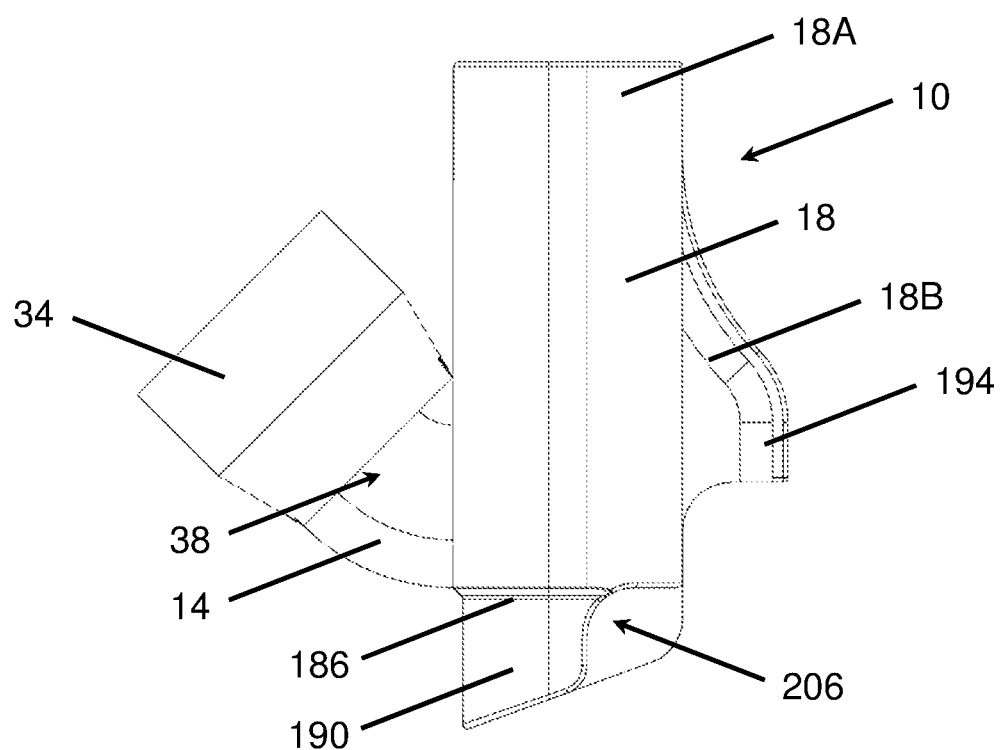
FIG. 23 is a drawing which shows a right side view of the dust shroud.

FIG. 23 shows a right side view of the dust collection shroud 10. The inside side of the lower portion 190 of the saw blade hood may include a rear notch 206 which removes a lower rear portion of the lower portion 190 of the saw blade hood 18.

Figure 24:
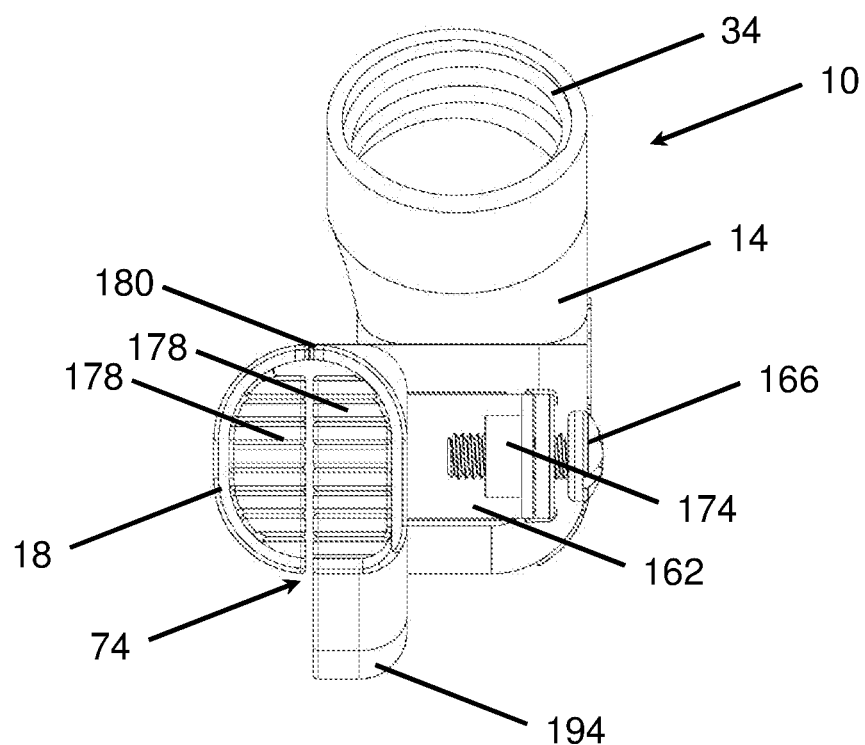
FIG. 24 is a drawing which shows a top view of the dust shroud.

FIG. 24 shows a top view of the dust collection shroud 10. The generally horizontal middle portion of the metal mounting bracket 162 is more easily seen. This drawing also illustrates how the fingers 178 extend laterally inwardly towards the center of the saw blade channel 66 and create a gap which is aligned with the saw blade slot 74.

Figure 25:
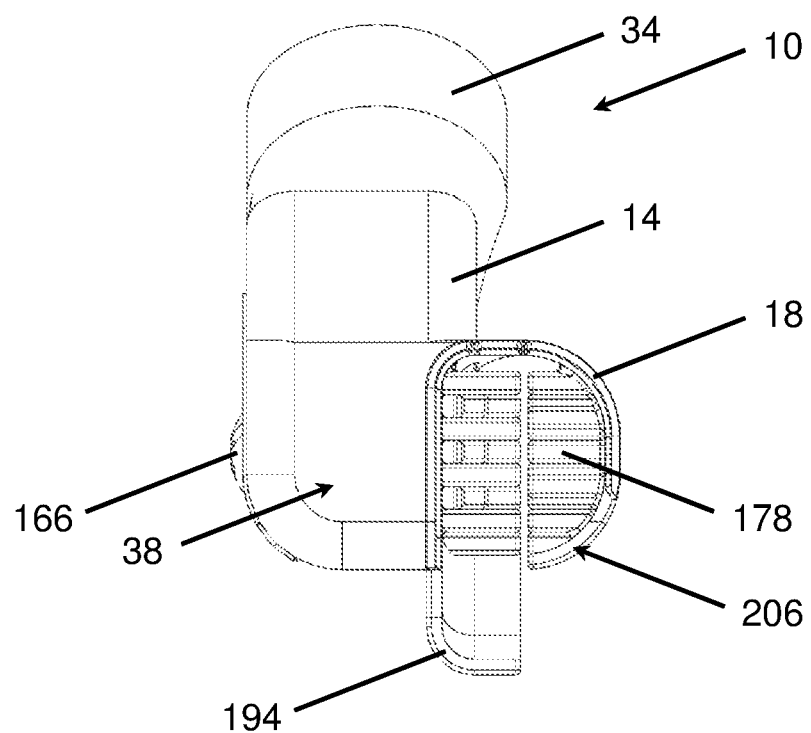
FIG. 25 is a drawing which shows a bottom view of the dust shroud
Figure 26:
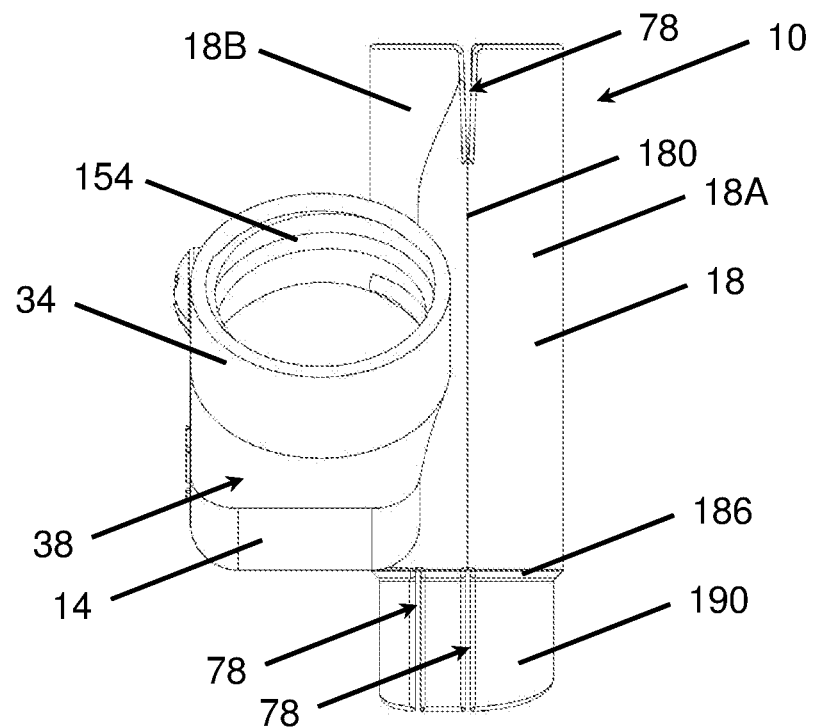
FIG. 26 is a drawing which shows a front view of the dust shroud.

FIG. 25 shows a bottom view of the dust collection shroud 10. FIG. 26 shows a front view of the dust collection shroud 10. The compression slots 78 formed in the top and in the bottom of the saw blade hood 18 allow the top portion and the bottom portion of the saw blade hood 18 to bend more easily and conform to the inside shape of the stationary upper blade guard 98 and the saw base plate 86.

Figure 27:
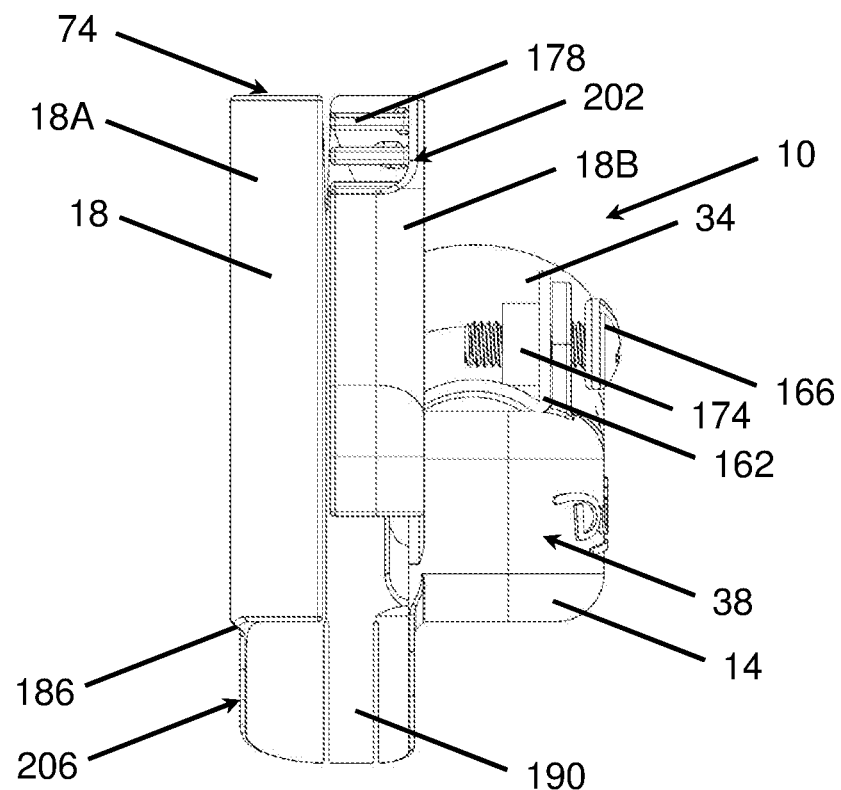
FIG. 27 is a drawing which shows a back view of the dust shroud.

FIG. 27 shows a back view of the dust collection shroud 10. The saw blade hood 18 does not include fingers 178 on the bottom portion of the hood 18 below the dust collection passage 38 and includes fingers 178 on the upper portion of the hood 18 above the dust collection passage 38.

Figure 28:
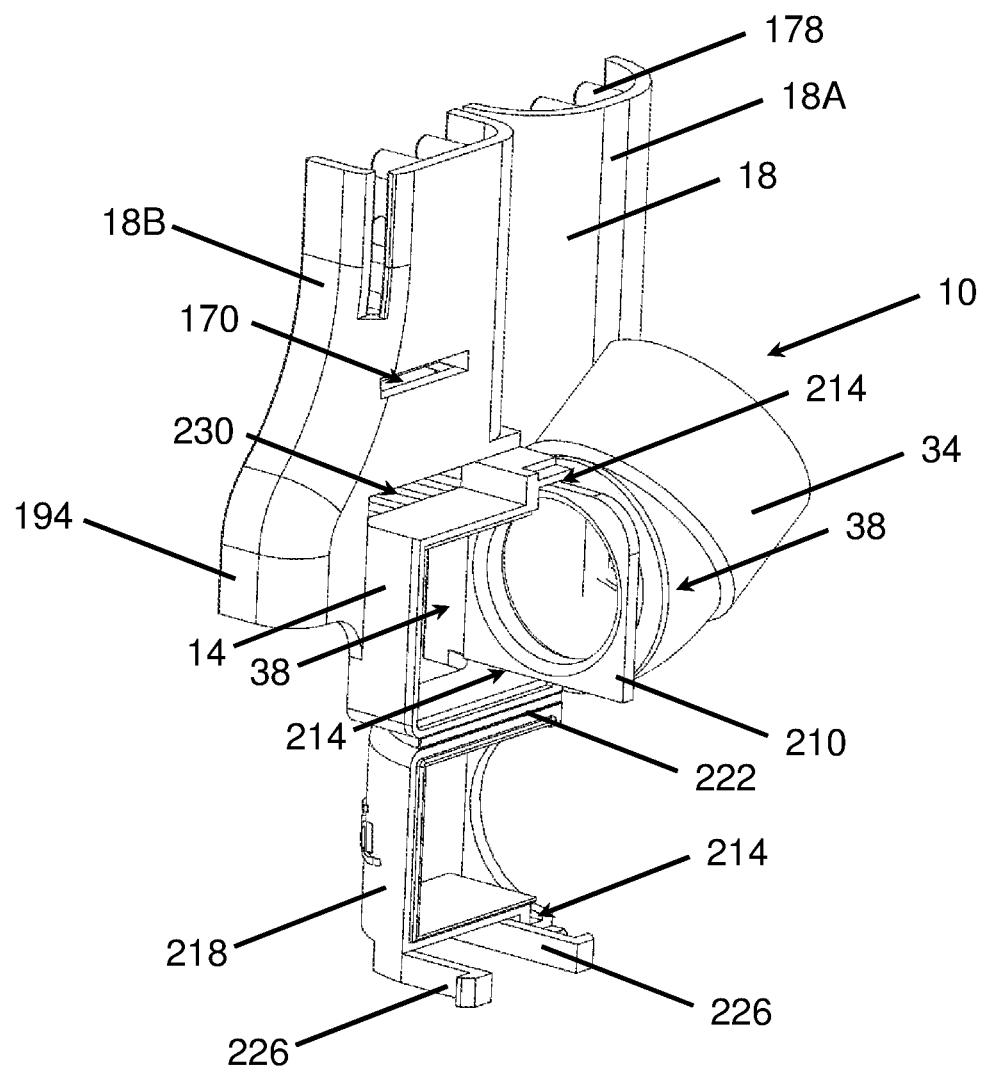
FIG. 28 is a drawing which shows a perspective view of the dust shroud.
Figure 29:
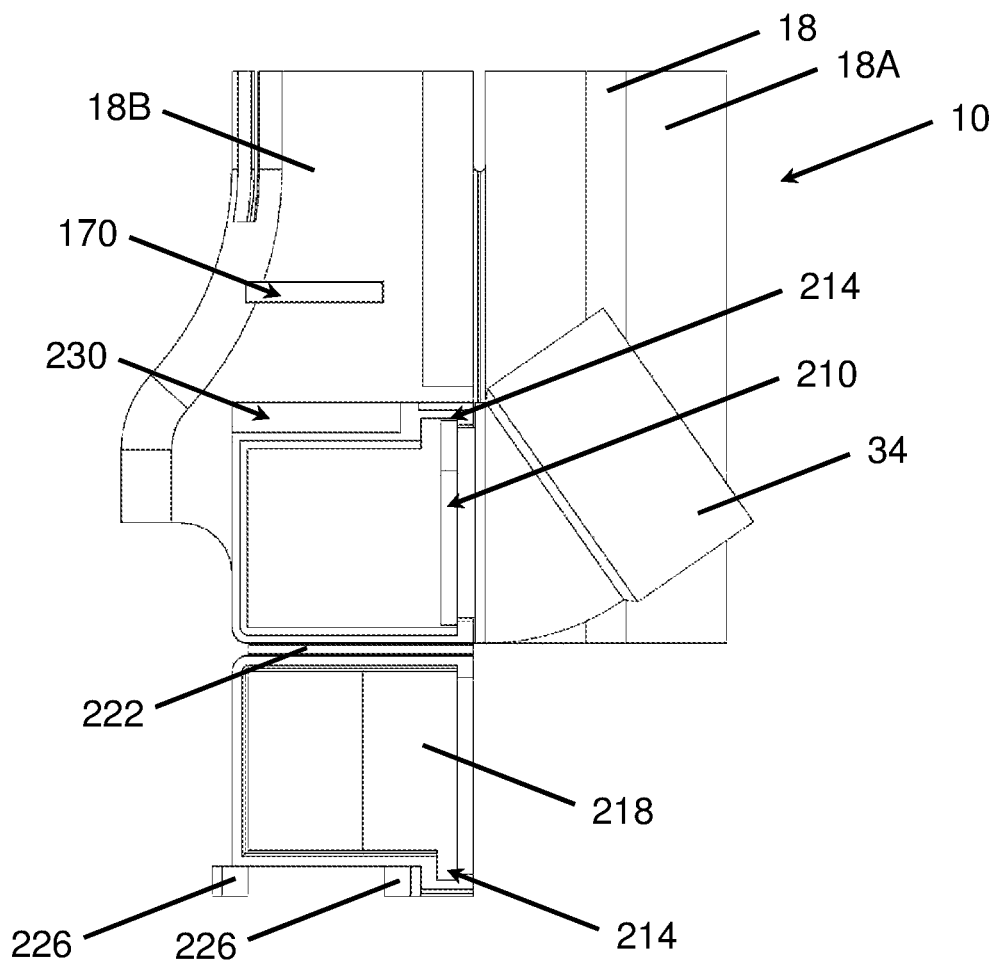
FIG. 29 is a drawing which shows a perspective view of the dust shroud.

FIG. 28 shows a rear perspective view of another embodiment of the dust collection shroud 10. FIG. 29 shows a left side view of the dust collection shroud. This embodiment is similar to the shroud 10 shown in FIGS. 13 through 27 and includes similar features unless otherwise noted. This dust collection shroud 10 includes a few modifications to allow for easier manufacture by conventional plastic molding. The vacuum port 34 has been molded as a separate piece. The separate vacuum port 34 is angled downwardly towards the saw base plate 86 as shown before and includes a portion of the dust collection passage 38 which directs the dust collection passage 38 horizontally backwards. The vacuum port 34 includes a flange 210 which is captured in a mating groove 214 in the body 14 of the dust collection shroud 10. The dust collection shroud body 14 is formed with a hatch 218 which is attached to the body 14 by a flexible hinge 222. The hatch 218 also includes a portion of the groove 214 and the vacuum port flange 210 is captured between the hatch 218 and body 14 when the hatch is closed. As shown, the hatch 218 also forms part of the dust collection passage 38. The hatch 218 includes two latching fingers 226 with retaining barbs that engage a slot 230 formed in the body 14 to hold the hatch 218 closed. The mounting flange 158 is formed on top of the hatch 218. Although they are not shown, the shroud 10 includes a mounting bracket 162, screw 166, and threaded boss 174. The slot 170 which allows the mounting bracket 162 to pass into the interior of the saw blade hood 18 is more easily seen without the mounting bracket 162 shown. The assembled shroud 10 is similarly configured and functions the same as the embodiment shown in FIGS. 13 through 27.

The dust collection shroud 10 is advantageous as it can be easily attached to many different brands and models of circular saws 82. The shroud 10 is secure while being easy to attach to the saw 82. The dust collection shroud 10 allows most of the dust and debris generated while using the saw to be collected and minimal debris escapes into the surrounding environment. The compact design of the dust collection shroud 10 provides little if any inconvenience to a person using the circular saw 82 and increases worker compliance in using the dust collection shroud.

The above description of illustrated examples of the present invention, including what is described in the Abstract, are not intended to be exhaustive or to be limiting to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A dust collection shroud for a hand held circular saw having a circular saw blade comprising:

a shroud body comprising:
  a saw blade hood having a left side wall, a right side wall, a front wall, and a back wall, the saw blade hood forming a dust collection chamber;
  a dust collection passage extending from the saw blade hood and pneumatically connected to the dust collection chamber via an opening in the saw blade hood;
  a vacuum port pneumatically connected to the dust collection passage;
  a plurality of projections which extend inwardly from the saw blade hood into the dust collection chamber, wherein, when the dust collection shroud is connected to a hand held circular saw for use, the plurality of projections are attached to the saw blade hood at a position above the opening to the dust collection passage such that the plurality of projections are after the opening to the dust collection passage relative to the rotation of the circular saw blade.

2. The dust collection shroud of claim 1, wherein the opening is located in one of the left side wall or the right side wall of the saw blade hood and wherein, when the dust collection shroud is connected to the hand held circular saw, the dust collection passage extends laterally away from the saw blade hood and forward to position the vacuum port in front of the saw blade.

3. The dust collection shroud of claim 1, further comprising:
  a mounting flange which extends generally parallel to and spaced apart from one of the left side wall or the right side wall of the saw blade hood;
  a metal mounting bracket which is attached to the shroud body and the mounting flange, wherein the mounting bracket comprises a first leg which is positioned adjacent to the mounting flange, a horizontal section which extends from the first leg towards the saw blade hood, and a second leg which is attached to the one of the left side wall or the right side wall of the saw blade hood;
  a screw which passes through the first leg of the mounting bracket; and
  wherein, when the dust collection shroud is attached to the hand held circular saw, a stationary upper blade guard is positioned between the first leg and the second leg and the stationary upper blade guard is held against the one of the left side wall or the right side wall of the saw blade hood by the screw.

4. The dust collection shroud of claim 3, wherein the second leg of the mounting bracket is located inside of the saw blade hood in the dust collection chamber and extends along the one of the left side wall or the right side wall of the saw blade hood.

5. The dust collection shroud of claim 3, wherein the mounting flange is attached to and extends vertically from the dust collection passage and wherein the first leg of the metal mounting bracket extends parallel to and in contact with the mounting flange.

6. The dust collection shroud of claim 1, wherein a top end of the saw blade hood is open and is positioned inside of a circular saw stationary upper blade guard, and wherein the plurality of projections are located between the opening to the dust collection passage and the top of the dust collection hood.

7. The dust collection shroud of claim 1, wherein the plurality of projections comprises a first group of projections which extend inwardly into the dust collection chamber from the left side wall and a second group of projections which extend inwardly into the dust collection chamber from the right side wall and create a gap between opposing projection ends, and wherein, when the dust collection shroud is attached to the hand held circular saw, a saw blade is positioned in the gap between the opposing projection ends.

8. The dust collection shroud of claim 1, wherein the plurality of projections comprise a first row of projections and a second row of projections located above the first row of projections.

9. The dust collection shroud of claim 1, wherein, when the dust collection shroud is connected to the hand held circular saw, the saw blade hood is positioned inside of a circular saw stationary upper blade guard such that a top of the saw blade hood is above a bottom of a front portion of the stationary upper blade guard and such that an outer front surface of the front wall of the saw blade hood is positioned adjacent an inner surface of the front portion of the upper blade guard.

10. A dust collection shroud for a hand held circular saw comprising:
  a plastic shroud body comprising:
    a saw blade hood forming a dust collection chamber in an interior thereof, the dust collection chamber being configured to receive a saw blade;
    a saw blade slot formed through a back of the saw blade hood;
    a dust collection passage extending from the saw blade hood and pneumatically connected to the dust collection chamber to remove dust from the dust collection chamber;
    a vacuum port pneumatically connected to the dust collection passage;
    a mounting flange extending generally parallel to and spaced apart from a side of the saw blade hood;
  a metal mounting bracket attached to the shroud body, the mounting bracket having a first leg which is positioned adjacent to the mounting flange, a horizontal section extending from the first leg towards the saw blade hood, and a second leg attached to the side of the saw blade hood;
  a screw which passes through the mounting flange and the first leg of the mounting bracket;
  wherein, when the dust collection shroud is mounted to a hand held circular saw:
    the saw blade hood is positioned inside of a circular saw stationary upper blade guard at a front of the stationary upper blade guard and the screw presses the upper blade guard against the side of the saw blade hood.

11. The dust collection shroud of claim 10, wherein, when the dust collection shroud is mounted to the hand held circular saw, the saw blade hood is positioned inside of the circular saw stationary upper blade guard wherein a top of the saw blade hood is above a bottom of the front of the stationary upper blade guard and wherein a front outer surface of the saw blade hood is adjacent an inner surface of the front of the stationary upper blade guard.

12. The dust collection shroud of claim 10, wherein the shroud comprises a first group of projections which extend inwardly into the dust collection chamber form a left side of the side blade hood and a second group projections which extend inwardly into the dust collection chamber from a right side of the saw blade hood and create a gap between ends of opposing projections, wherein, when the dust collection shroud is in use, a saw blade is positioned in the gap between the ends of the opposing projections, and wherein the side of the saw blade hood to which the second leg of the mounting bracket is attached is one of the left or right sides of the saw blade hood.

13. The dust collection shroud of claim 10, further comprising projections which extend inwardly into the dust collection chamber from the saw blade hood from a location in the saw blade hood which is above an opening connecting the dust collection chamber to the dust collection passage such that, relative to rotation of a circular saw blade of the hand held circular saw, the projections are located after the opening to the dust collection passage.

14. The dust collection shroud of claim 13, wherein a top end of the saw blade hood is open and wherein the projections extend inwardly from left and right sides of the saw blade hood at locations between the opening to the dust collection passage and the top of the saw blade hood, wherein the side of the saw blade hood to which the second leg of the mounting bracket is attached is one of the left or right sides of the saw blade hood.

15. The dust collection shroud of claim 13, wherein the projections comprise a first row of projections and a second row of projections located above the first row of projections relative to the opening.

16. A dust collection shroud for a hand held circular saw comprising:
- a shroud body comprising:
    - a saw blade hood forming a dust collection chamber in an interior thereof;
    - a saw blade slot formed through a back of the saw blade hood;
    - an opening in a lower portion of the saw blade hood;
    - a dust collection passage extending from the saw blade hood and pneumatically connected to the interior of the saw blade hood via the opening and configured to remove dust from the dust collection chamber;
    - a first group of projections which extend inwardly into the dust collection chamber from a left side of the saw blade hood from a position on the saw blade hood which is above the opening;
    - a second group of projections which extend inwardly into the dust collection chamber from a right side of the saw blade hood from a position on the saw blade hood which is above the opening;
    - wherein, when the dust collection shroud is connected to a hand held circular saw for use, the position at which the first group of projections and the second group of projections are attached to the saw blade hood is above the opening to the dust collection passage.

17. The dust collection shroud of claim 16, wherein a top of the saw blade hood is open and is positioned inside of a circular saw stationary upper blade guard and wherein the first group of projections and the second group of projections are located above the opening and below the top of the saw blade hood.

18. The dust collection shroud of claim 16, wherein the first group of projections comprises a first row of projections and a second row of projections located above the first row of projections, and wherein the second group of projections comprises a first row of projections and a second row of projections located above the first row of projections.

19. The dust collection shroud of claim 16, further comprising
- a mounting flange which extends generally parallel to and spaced apart from one of the left side or the right side of the saw blade hood;
- a metal mounting bracket attached to the shroud body, wherein the mounting bracket comprises a first leg which is positioned adjacent to the mounting flange, a horizontal section which extends from the first leg towards the saw blade hood, and a second leg which is attached to the one of the left side or the right side of the saw blade hood, a screw which passes through the mounting flange and the first leg of the mounting bracket, and wherein, when the dust collection shroud is attached to the hand held circular saw, a circular saw stationary upper blade guard is positioned between the first leg and the second leg and the stationary upper blade guard is held against the one of the left side or the right side of the saw blade hood by the screw.

20. The dust collection shroud of claim 16, wherein, when the dust collection shroud is connected to the hand held circular saw, the saw blade hood is positioned inside of a circular saw stationary upper blade guard such that a top of the saw blade hood is above a bottom of a front of the stationary upper blade guard and such that an outer front surface of the front of the saw blade hood is positioned against an inner surface of the front of the upper blade guard.

* * * * *